(12) United States Patent
Ogawa et al.

(10) Patent No.: US 11,444,939 B2
(45) Date of Patent: Sep. 13, 2022

(54) AUTHENTICATION CONTROL DEVICE, AUTHENTICATION CONTROL METHOD, AND AUTHENTICATION CONTROL PROGRAM

(71) Applicants: SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP)

(72) Inventors: Akihiro Ogawa, Osaka (JP); Hirofumi Urayama, Osaka (JP); Takeshi Hagihara, Yokkaichi (JP); Yasuhiro Yabuuchi, Yokkaichi (JP)

(73) Assignees: SUMITOMO ELECTRIC INDUSTRIES, LTD., Osaka (JP); AUTONETWORKS TECHNOLOGIES, LTD., Mie (JP); SUMITOMO WIRING SYSTEMS, LTD., Mie (JP)

( * ) Notice: Subject to any disclaimer, the term of this patent is extended or adjusted under 35 U.S.C. 154(b) by 268 days.

(21) Appl. No.: 16/629,982

(22) PCT Filed: Jun. 12, 2018

(86) PCT No.: PCT/JP2018/022351
§ 371 (c)(1),
(2) Date: Jan. 10, 2020

(87) PCT Pub. No.: WO2019/012889
PCT Pub. Date: Jan. 17, 2019

(65) Prior Publication Data
US 2020/0137049 A1   Apr. 30, 2020

(30) Foreign Application Priority Data
Jul. 10, 2017  (JP) .............................. JP2017-134272

(51) Int. Cl.
*H04L 29/06* (2006.01)
*H04W 4/40* (2018.01)
(Continued)

(52) U.S. Cl.
CPC ......... *H04L 63/0853* (2013.01); *H04B 7/155* (2013.01); *H04L 63/083* (2013.01);
(Continued)

(58) Field of Classification Search
CPC ............... H04L 63/0853; H04L 63/083; H04L 63/0876; H04L 63/105; H04W 4/40; H04W 12/06
(Continued)

(56) References Cited

U.S. PATENT DOCUMENTS 8,230,149 B1 * 7/2012 Long ....................... G06F 13/12
710/305
2005/0192716 A1   9/2005 Ito et al.
(Continued)

FOREIGN PATENT DOCUMENTS

CN   105099689 A   11/2015
JP   H10-304333 A  11/1998
(Continued)

OTHER PUBLICATIONS

Secure Information Sharing among Autonomous Vehicles in NDN, Chowdhury et al, Apr. 2017 (Year: 2017).*

*Primary Examiner* — Jahangir Kabir
(74) *Attorney, Agent, or Firm* — Oliff PLC

(57) ABSTRACT

An authentication control device includes: an acquisition unit configured to acquire predetermined identification information regarding an on-vehicle device to be newly added to an on-vehicle network; and a determination unit configured to determine which of a plurality of types of authentication procedures is to be applied as an authentica-
(Continued)

tion process for the on-vehicle device, on the basis of the identification information acquired by the acquisition unit.

17 Claims, 16 Drawing Sheets

(51) Int. Cl.
*H04L 9/40* (2022.01)
*H04B 7/155* (2006.01)
(52) U.S. Cl.
CPC ........ *H04L 63/0876* (2013.01); *H04L 63/105* (2013.01); *H04W 4/40* (2018.02)
(58) Field of Classification Search
USPC ............................................................ 726/7
See application file for complete search history.

(56) References Cited

U.S. PATENT DOCUMENTS

| | | | |
|---|---|---|---|
| 2007/0005197 | A1 | 1/2007 | Ito et al. |
| 2016/0173530 | A1 | 6/2016 | Miyake |
| 2017/0111177 | A1 | 4/2017 | Oguma et al. |
| 2017/0192835 | A1* | 7/2017 | Narayanan .............. H04L 41/06 |
| 2018/0302422 | A1* | 10/2018 | Kishikawa ............ H04L 9/3271 |

FOREIGN PATENT DOCUMENTS

| | | |
|---|---|---|
| JP | 2005-196568 A | 7/2005 |
| JP | 2013-168865 A | 8/2013 |
| JP | 2015-233176 A | 12/2015 |
| JP | 2017-079369 A | 4/2017 |

* cited by examiner

FIG. 10

| MAC ADDRESS | RELIABILITY | AUTHENTICATION RESULT |
|---|---|---|
| AA:AA:AA:AA:AA:AA | LOW | SUCCESS |

FIG. 12

| MAC ADDRESS | RELIABILITY | AUTHENTICATION RESULT |
|---|---|---|
| AA:AA:AA:AA:AA:AA | LOW | SUCCESS |
| MAC ADDRESS OF EXPANSION DEVICE 111B | INTERMEDIATE | SUCCESS |

FIG. 14

| MAC ADDRESS | RELIABILITY |
|---|---|
| AA:AA:AA:AA:AA:01 | HIGH |
| MAC ADDRESS OF EXPANSION DEVICE 111B | INTERMEDIATE |

FIG. 16

| PRODUCT NUMBER | RELIABILITY |
|---|---|
| ABCD1234 | HIGH |
| PRODUCT NUMBER OF EXPANSION DEVICE 111B | INTERMEDIATE |

AUTHENTICATION CONTROL DEVICE, AUTHENTICATION CONTROL METHOD, AND AUTHENTICATION CONTROL PROGRAM

TECHNICAL FIELD

The present invention relates to an authentication control device, an authentication control method, and an authentication control program.

This application claims priority on Japanese Patent Application No. 2017-134272 filed on Jul. 10, 2017, the entire contents of which are incorporated herein by reference.

BACKGROUND ART

PATENT LITERATURE 1 (Japanese Laid-Open Patent Publication No. 2013-168865) discloses an on-vehicle network system as follows. That is, the on-vehicle network system includes: an on-vehicle control device having a memory that stores therein definition data defining a part, of a communication protocol used in an on-vehicle network, which depends on implementation on the on-vehicle network; and a communication protocol issuing device that issues the definition data to the on-vehicle control device. When the communication protocol issuing device receives, from a registration device that allows the on-vehicle control device to participate in the on-vehicle network, a registration request that requests participation of the on-vehicle control device in the on-vehicle network, the communication protocol issuing device performs authentication for the registration device, creates the definition data based on implementation on the on-vehicle network, and returns the definition data to the registration device. The registration device receives the definition data transmitted from the communication protocol issuing device, and requests the on-vehicle control device to store the received definition data in the memory. Then, the on-vehicle control device receives the definition data from the registration device, stores the definition data in the memory, and performs communication by using the on-vehicle network, based on the part, of the communication protocol, defined by the definition data.

CITATION LIST

Patent Literature

PATENT LITERATURE 1: Japanese Laid-Open Patent Publication No. 2013-168865

SUMMARY OF INVENTION (1) An authentication control device according to the present disclosure includes: an acquisition unit configured to acquire predetermined identification information regarding an on-vehicle device to be newly added to an on-vehicle network; and a determination unit configured to determine which of a plurality of types of authentication procedures is to be applied as an authentication process for the on-vehicle device, on the basis of the identification information acquired by the acquisition unit.

(17) An authentication control method according to the present disclosure is an authentication control method in an authentication control device, the authentication control method including the steps of: acquiring predetermined identification information regarding an on-vehicle device to be newly added to an on-vehicle network; and determining which of a plurality of types of authentication procedures is to be applied as an authentication process for the on-vehicle device, on the basis of the acquired identification information.

(18) An authentication control program according to the present disclosure is an authentication control program used in an authentication control device, the authentication control program causing a computer to function as: an acquisition unit configured to acquire predetermined identification information regarding an on-vehicle device to be newly added to an on-vehicle network; and a determination unit configured to determine which of a plurality of types of authentication procedures is to be applied as an authentication process for the on-vehicle device, on the basis of the identification information acquired by the acquisition unit.

One mode of the present disclosure can be realized not only as an authentication control device including such a characteristic processing unit but also as an on-vehicle communication system including such an authentication control device. Further, one mode of the present disclosure can be realized as a semiconductor integrated circuit that realizes a part or the entirety of the authentication control device.

BRIEF DESCRIPTION OF DRAWINGS

FIG. 10 shows an example of an authentication history table retained in a determination unit in the authentication control device according to the embodiment of the present disclosure.

FIG. 12 shows an example of the authentication history table retained in the determination unit in the authentication control device according to the embodiment of the present disclosure.

FIG. 14 shows an example of a reliability table retained in a server in the communication system according to the embodiment of the present disclosure.

FIG. 16 shows an example of the reliability table retained in the server in the communication system according to the embodiment of the present disclosure.

DESCRIPTION OF EMBODIMENTS

Figure 1:
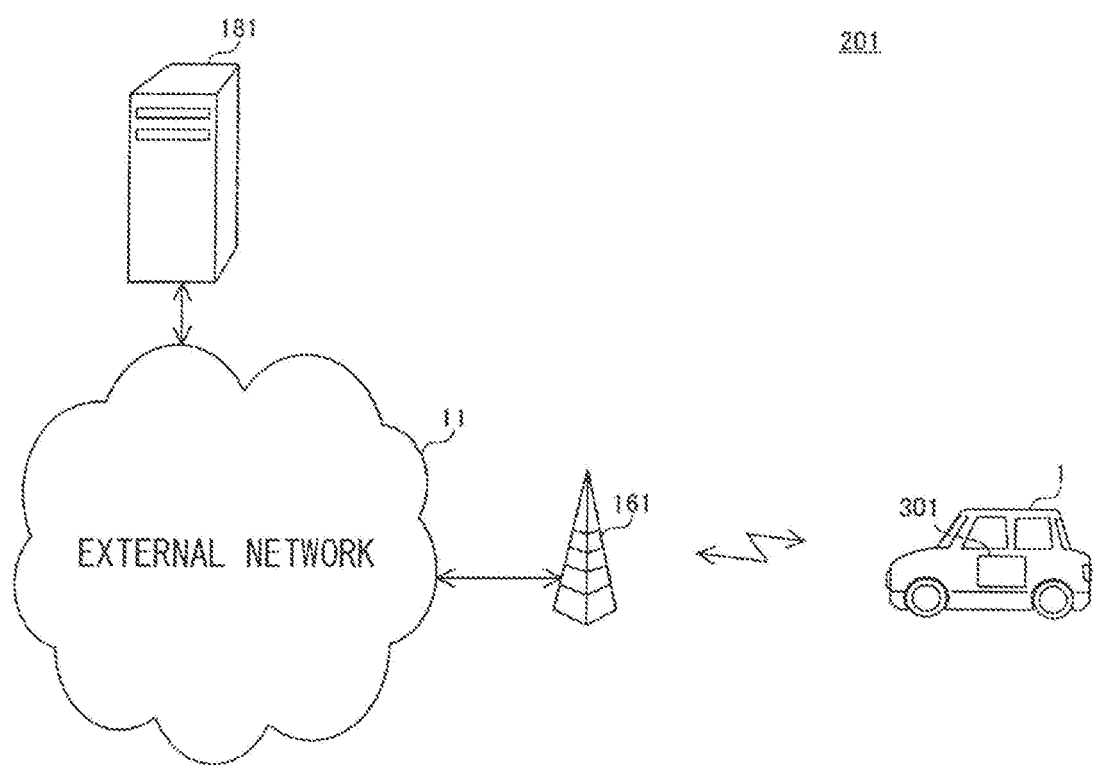
FIG. 1 is a diagram showing the configuration of a communication system according to an embodiment of the present disclosure.

Hitherto, on-vehicle network systems for improving security in an on-vehicle network have been developed.

Problems to be Solved by the Present Disclosure

In the on-vehicle network system disclosed in PATENT LITERATURE 1, an on-vehicle control device that performs communication not complying with a communication protocol, for example, a denial-of-service (DoS) attack, eavesdropping, etc., is detected as an unauthorized on-vehicle control device.

Thus, the on-vehicle control device can perform a DoS attack and eavesdropping until the same is detected as an unauthorized on-vehicle control device.

In order to prevent such a DoS attack, eavesdropping, etc., from being performed, a configuration that does not permit an unauthorized on-vehicle control device to participate in the on-vehicle network system is preferable. However, such a configuration is not disclosed in PATENT LITERATURE 1.

The present disclosure has been made to solve the above problem, and an object of the present disclosure is to provide an authentication control device, an authentication control method, and an authentication control program that are capable of providing satisfactory communication in an on-vehicle network.

Effects of the Present Disclosure

According to the present disclosure, it is possible to provide satisfactory communication in an on-vehicle network.

Description of Embodiments of the Present Disclosure

First, contents of embodiments of the present disclosure are listed and described.

(1) An authentication control device according to an embodiment of the present disclosure includes: an acquisition unit configured to acquire predetermined identification information regarding an on-vehicle device to be newly added to an on-vehicle network; and a determination unit configured to determine which of a plurality of types of authentication procedures is to be applied as an authentication process for the on-vehicle device, on the basis of the identification information acquired by the acquisition unit.

With the configuration to determine which of the plurality of types of authentication procedures is to be applied on the basis of the identification information as described above, for example, authentication corresponding to an on-vehicle device to be newly added can be performed. Thus, whether or not the on-vehicle device is valid can be more correctly determined. Accordingly, an unauthorized on-vehicle device can be detected before unauthorized communication such as a DoS attack and eavesdropping is performed, and thus occurrence of unauthorized communication in the on-vehicle network can be prevented. Therefore, satisfactory communication can be provided in the on-vehicle network.

(2) Preferably, the determination unit determines reliability of the on-vehicle device on the basis of the identification information acquired by the acquisition unit, and determines the authentication procedure corresponding to the determined reliability.

With this configuration, for example, a strict authentication procedure can be applied for an on-vehicle device for which the reliability has been determined as being low. Thus, the accuracy of detection of an unauthorized on-vehicle device can be improved. In addition, for example, a simple authentication procedure can be applied for an on-vehicle device for which the reliability has been determined as being high. Thus, the load of the authentication process can be reduced.

(3) Preferably, the identification information is information with which a place where work for mounting the on-vehicle device is performed is identifiable.

For example, the degree of involvement of a vehicle manufacturer with respect to an on-vehicle device is different depending on a place where work for mounting the on-vehicle device is performed, such as a manufacturing factory, a dealer, or another place. With the above configuration, appropriate evaluation for the reliability, the validity, etc., of an on-vehicle device can be performed on the basis of the degree of involvement corresponding to a place where work for mounting the on-vehicle device has been performed.

(4) Preferably, the identification information is at least either one of a product number and a model number of the on-vehicle device.

With this configuration, for example, the manufacturer, the production time, and the specifications of an on-vehicle device can be recognized on the basis of at least either one of the product number and the model number of the on-vehicle device. Thus, appropriate evaluation for the reliability, the validity, etc., of the on-vehicle device can be performed.

(5) Preferably, the identification information is information with which the on-vehicle device is uniquely identifiable.

With this configuration, for example, the manufacturer, the production time, the specifications, etc., corresponding to the identification information can be acquired from a server retaining a correspondence relationship between: information with which an on-vehicle device is uniquely identifiable; and the manufacturer, the production time, the specifications, etc., of the on-vehicle device. Thus, appropriate evaluation for the reliability, the validity, etc., of the on-vehicle device can be performed.

(6) Preferably, the determination unit determines the authentication procedure to be newly applied, further on the basis of the authentication procedure applied for the on-vehicle device in the past.

With this configuration, for example, a simple authentication procedure can be newly applied for an on-vehicle device for which an authentication result by an authentication procedure applied in the past is satisfactory. In addition, a strict authentication procedure can be newly applied for an on-vehicle device for which the above authentication result is bad. That is, the authentication procedure corresponding to the above authentication result can be applied. Therefore, the authentication process can be efficiently performed.

(7) Preferably, the authentication control device is included in a relay device configured to relay data in the on-vehicle network.

With the configuration in which the authentication control device is included in the relay device capable of more assuredly performing communication with an on-vehicle device as described above, an authentication procedure can be more assuredly determined.

(8) More preferably, the identification information is included in an authentication key used in the authentication process with the relay device.

The configuration in which the identification information is included in the authentication key can make it difficult to falsify the identification information in order to cause a simpler authentication procedure to be determined. Thus, an unauthorized on-vehicle device can be prevented from successfully impersonating a valid on-vehicle device.

(9) Preferably, the plurality of types of authentication procedures include a plurality of authentication procedures different from each other in number of authentication devices performing the authentication process for the on-vehicle device.

With this configuration, the number of authentication devices can be varied in accordance with the reliability, the validity, etc., of an on-vehicle device. Thus, the strictness of each authentication procedure can be adjusted as appropriate.

(10) Preferably, the plurality of types of authentication procedures include a plurality of authentication procedures different from each other in authentication devices performing the authentication process for the on-vehicle device.

With this configuration, different authentication devices can be used depending on the reliability, the validity, etc., of an on-vehicle device. Thus, the strictness of each authentication procedure can be adjusted as appropriate.

(11) More preferably, an authentication key used in the authentication process is different for each authentication device.

With the configuration in which the authentication key is made different for each authentication device as described above, the authentication process can be complicated. Thus, it can be made difficult to break through the authentication process by fraud. That is, the security in the on-vehicle network can be improved.

(12) More preferably, a relay device configured to relay data in the on-vehicle network is included in the authentication device.

With the configuration in which the relay device which is the linchpin of data transmission in the on-vehicle network is included in the authentication device as described above, for example, when an authenticated on-vehicle device is actually unauthorized, data transmission by unauthorized communication of the on-vehicle device can be more assuredly stopped.

(13) More preferably, when the authentication process for the on-vehicle device by the relay device has been successfully performed, the relay device instructs another on-vehicle device that is to be a communication partner for the on-vehicle device, to start the authentication process.

With the configuration to perform the authentication process between on-vehicle devices, which are to perform communication with each other in the on-vehicle network, when the authentication process by the relay device has been successfully performed as described above, the validity of a newly added on-vehicle device can be more correctly determined.

(14) More preferably, when the authentication process for the on-vehicle device by the relay device has been successfully performed, the relay device instructs another relay device to start the authentication process.

With the configuration to cause the other relay device to perform the authentication process for a newly added on-vehicle device when the authentication process by the relay device has been successfully performed as described above, the validity of the on-vehicle device can be more correctly determined.

(15) Preferably, the plurality of types of authentication procedures include a plurality of authentication procedures having different security levels.

With this configuration, the security level can be varied in accordance with the reliability, the validity, etc., of an on-vehicle device. Thus, the strictness of each authentication procedure can be adjusted as appropriate.

(16) Preferably, the determination unit determines the reliability of the on-vehicle device on the basis of the identification information acquired by the acquisition unit, and determines the authentication procedure having a larger number of authentication devices performing the authentication process for the on-vehicle device when the determined reliability is lower.

With the configuration to cause more authentication devices to authenticate an on-vehicle device having low reliability, that is, an on-vehicle device that is highly likely to be unauthorized, as described above, whether or not a newly added on-vehicle device is valid can be more correctly determined.

(17) An authentication control method according to an embodiment of the present disclosure is an authentication control method in an authentication control device, the authentication control method including the steps of: acquiring predetermined identification information regarding an on-vehicle device to be newly added to an on-vehicle network; and determining which of a plurality of types of authentication procedures is to be applied as an authentication process for the on-vehicle device, on the basis of the acquired identification information.

With the configuration to determine which of the plurality of types of authentication procedures is to be applied on the basis of the identification information as described above, for example, authentication corresponding to an on-vehicle device to be newly added can be performed. Thus, whether or not the on-vehicle device is valid can be more correctly determined. Accordingly, an unauthorized on-vehicle device can be detected before unauthorized communication such as a DoS attack and eavesdropping is performed, and thus occurrence of unauthorized communication in the on-vehicle network can be prevented. Therefore, satisfactory communication can be provided in the on-vehicle network.

(18) An authentication control program according to an embodiment of the present disclosure is an authentication control program used in an authentication control device, the authentication control program causing a computer to function as: an acquisition unit configured to acquire predetermined identification information regarding an on-vehicle device to be newly added to an on-vehicle network; and a determination unit configured to determine which of a plurality of types of authentication procedures is to be applied as an authentication process for the on-vehicle device, on the basis of the identification information acquired by the acquisition unit.

With the configuration to determine which of the plurality of types of authentication procedures is to be applied on the basis of the identification information as described above, for example, authentication corresponding to an on-vehicle device to be newly added can be performed. Thus, whether or not the on-vehicle device is valid can be more correctly determined. Accordingly, an unauthorized on-vehicle device can be detected before unauthorized communication such as a DoS attack and eavesdropping is performed, and thus occurrence of unauthorized communication in the on-vehicle network can be prevented. Therefore, satisfactory communication can be provided in the on-vehicle network.

Hereinafter, embodiments of the present disclosure will be described with reference to the drawings. In the drawings, the same or corresponding parts are denoted by the same reference characters, and description thereof is not repeated. At least some parts of the embodiments described below may be combined together as desired.

[Configuration and Basic Operation]

FIG. 1 is a diagram showing the configuration of a communication system according to the embodiment of the present disclosure.

With reference to FIG. 1, a communication system 201 includes a server 181 and an on-vehicle communication system 301. The on-vehicle communication system 301 is mounted on a vehicle 1.

Figure 2:
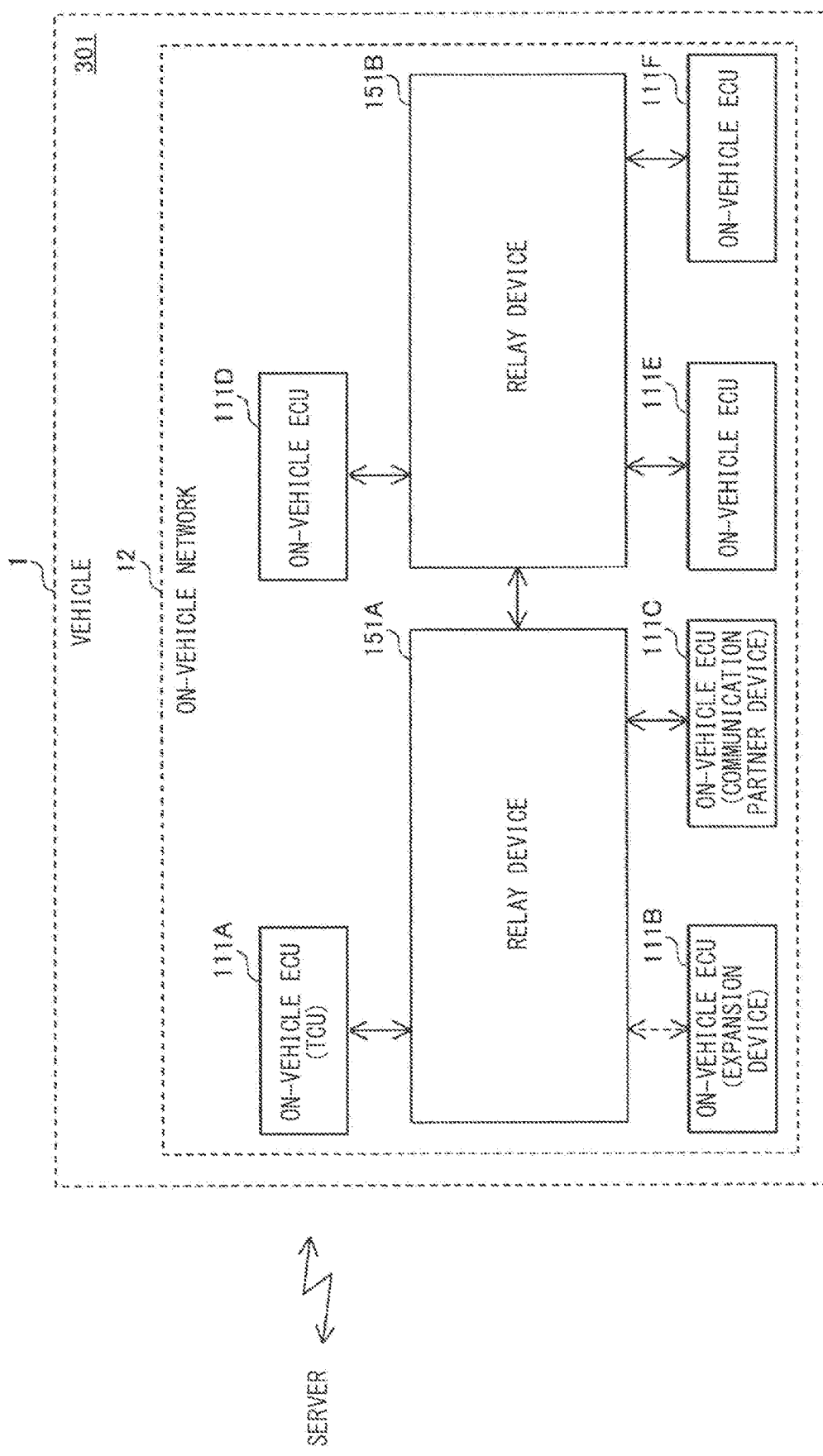
FIG. 2 is a diagram showing the configuration of an on-vehicle communication system according to the embodiment of the present disclosure.

FIG. 2 is a diagram showing the configuration of the on-vehicle communication system according to the embodiment of the present disclosure.

With reference to FIG. 2, the on-vehicle communication system 301 includes on-vehicle electronic control units (ECUs) 111A to 111F and relay devices 151A and 151B.

Hereinafter, each of the on-vehicle ECUs 111A to 111F is also referred to as on-vehicle ECU 111. In addition, each of the relay devices 151A and 151B is also referred to as relay device 151. The on-vehicle ECU 111 and the relay device 151 are examples of an on-vehicle device.

The on-vehicle communication system 301 is not limited to a configuration including six on-vehicle ECUs 111, and may have a configuration including five or less on-vehicle ECUs 111, or seven or more on-vehicle ECUs 111. The on-vehicle communication system 301 is not limited to a configuration including two relay devices 151, and may have a configuration including one relay device 151 or three or more relay devices 151.

The on-vehicle ECU 111A is, for example, a telematics communication unit (TCU). Hereinafter, the on-vehicle ECU 111A is also referred to as TCU 111A.

Examples of the on-vehicle ECUs 111B to 111F include an autonomous driving electronic control unit (ECU), a sensor, a navigation device, a human machine interface, and a camera.

In an on-vehicle network 12, the on-vehicle ECUs 111A and 111C are each connected to the relay device 151A via an Ethernet (registered trademark) cable. The on-vehicle ECUs 111D to 111F are each connected to the relay device 151B via an Ethernet cable.

The relay devices 151A and 151B are, for example, switch devices and are connected to each other via an Ethernet cable. The relay devices 151A and 151B may be gateway devices.

For example, the on-vehicle ECU 111B is not connected to the relay device 151A in the initial state. For example, at any of a manufacturing factory for the vehicle 1, a dealer for the vehicle 1, a retailer for replacement parts for the vehicle 1, etc., the on-vehicle ECU 111B is mounted to the vehicle 1 and connected to the relay device 151A via an Ethernet cable.

In this example, a communication partner for the on-vehicle ECU 111B in the case where the on-vehicle ECU 111B has been connected to the relay device 151A is, for example, the on-vehicle ECU 111C.

Hereinafter, the on-vehicle ECUs 111B and 111C are also referred to as expansion device 111B and communication partner device 111C, respectively.

The relay device 151 performs a relay process for an Ethernet frame in accordance with a communication standard of Ethernet.

Specifically, for example, the relay device 151 relays an Ethernet frame that is sent/received between the on-vehicle ECUs 111. An IP packet is stored in the Ethernet frame.

The on-vehicle communication system 301 is not limited to the configuration to perform relay of an Ethernet frame in accordance with the communication standard of Ethernet, and may be configured to perform data relay in accordance with a communication standard such as controller area network (CAN) (registered trademark), FlexRay (registered trademark), media oriented systems transport (MOST) (registered trademark), or local interconnect network (LIN).

With reference to FIG. 1 and FIG. 2, the TCU 111A is capable of communicating with the server 181. In detail, for example, the TCU 111A is capable of communicating with the server 181 via a wireless base station device 161 in accordance with the IP protocol.

In more detail, for example, the TCU 111A is capable of performing wireless communication with the wireless base station device 161 in accordance with a communication standard such as Long Term Evolution (LTE) or 3G.

Specifically, for example, when the TCU 111A has received a wireless frame in which an IP packet from an IP server is stored from the wireless base station device 161, the TCU 111A acquires the IP packet from the received wireless frame, stores the acquired IP packet in an Ethernet frame, and then transmits the Ethernet frame to the relay device 151A.

Upon receiving an Ethernet frame from the relay device 151A, the TCU 111A acquires an IP packet from the received Ethernet frame, stores the acquired IP packet in a wireless frame, and transmits the wireless frame to the wireless base station device 161.

Upon receiving the wireless frame from the TCU 111A, the wireless base station device 161 acquires the IP packet from the received wireless frame and transmits the acquired IP packet to the server 181 via an external network 11.

Upon receiving an IP packet from the server 181 via the external network 11, the wireless base station device 161 stores the received IP packet in a wireless frame and transmits the wireless frame to the TCU 111A.

Figure 3:
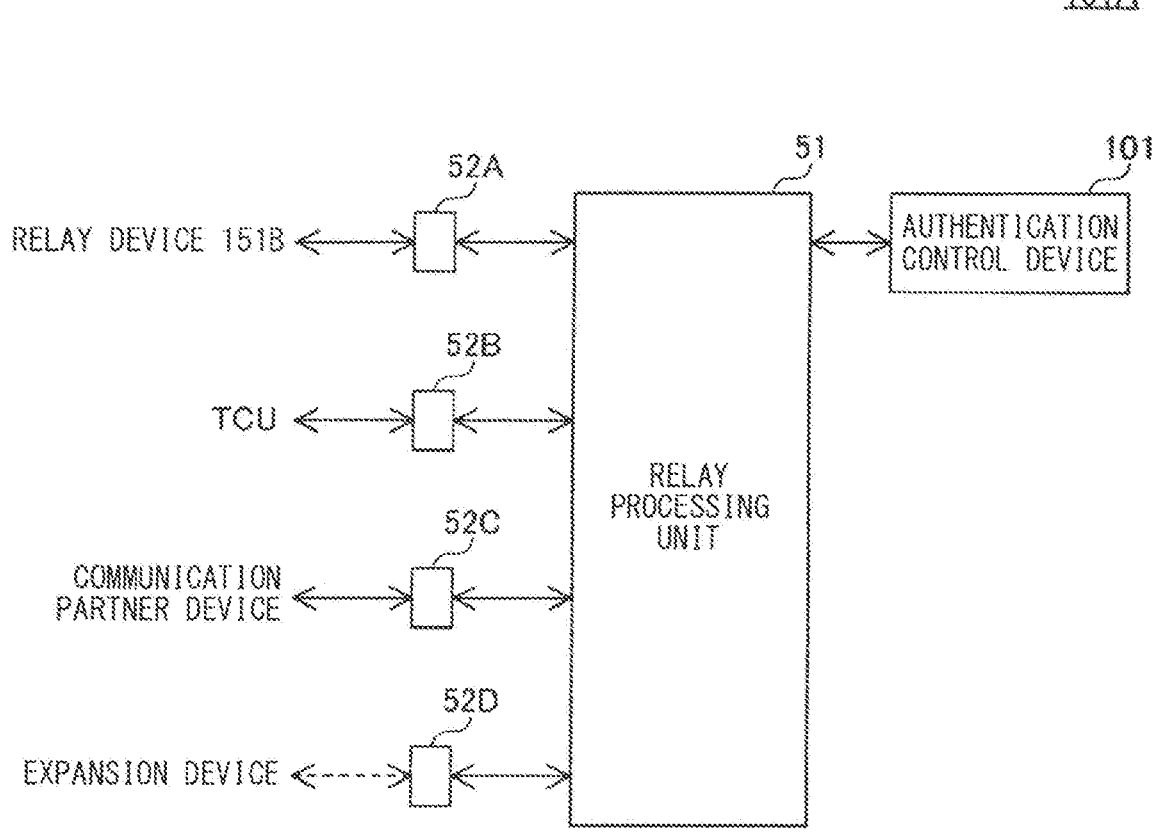
FIG. 3 is a diagram showing the configuration of a relay device in the on-vehicle communication system according to the embodiment of the present disclosure.

FIG. 3 is a diagram showing the configuration of the relay device in the on-vehicle communication system according to the embodiment of the present disclosure.

With reference to FIG. 3, the relay device 151A includes a relay processing unit 51, communication ports 52A, 52B, 52C, and 52D, and an authentication control device 101.

Although FIG. 3 shows the configuration of the relay device 151A, the relay device 151B has a configuration that is the same as that of the relay device 151A.

Hereinafter, each of the communication ports 52A, 52B, 52C, and 52D is also referred to as communication port 52. The communication port 52 is, for example, a terminal connectable with an Ethernet cable.

In this example, the communication ports 52A, 52B, and 52C are connected to the relay device 151B, the TCU 111A, and the communication partner device 111C, respectively.

The communication port 52D is, for example, a communication port used for connection of the expansion device 111B (hereinafter, also referred to as expansion port), and is a free port in the initial state.

The relay processing unit 51 performs a relay process for an Ethernet frame. Specifically, for example, when the relay processing unit 51 has received an Ethernet frame via the communication port 52, the relay processing unit 51 performs a layer-2 switch process and a layer-3 relay process for the received Ethernet frame.

Then, the relay processing unit 51 transmits, via another communication port 52, the Ethernet frame that has undergone the switch process and the relay process.

The relay processing unit 51 retains registration information indicating a communication path in which a switch process and a relay process are permitted. The communication path is specified by, for example, a pair of a transmission-source media access control (MAC) address and a transmission-destination MAC address, a pair of a transmission-source IP address and a transmission-destination IP address, etc.

For example, the relay processing unit 51 performs a filter process for an Ethernet frame on the basis of the retained registration information.

Figure 4:
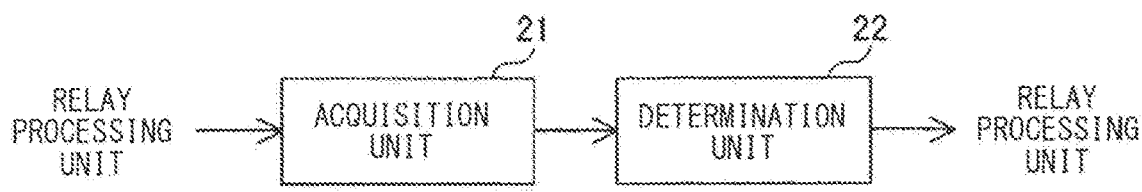
FIG. 4 is a diagram showing the configuration of an authentication control device in the on-vehicle communication system according to the embodiment of the present disclosure.

FIG. 4 is a diagram showing the configuration of the authentication control device in the on-vehicle communication system according to the embodiment of the present disclosure.

With reference to FIG. 4, the authentication control device 101 includes an acquisition unit 21 and a determination unit 22.

[Flow of Operation]

Each device in the communication system 201 includes a computer, and a calculation processing unit such as a CPU in the computer reads a program including some or all of steps in the following sequence chart or flowchart from a memory (not shown), and executes the program. The programs for the plurality of devices can each be installed from the outside. The programs for the plurality of devices are each distributed in a state of being stored in a storage medium.

Figure 5:
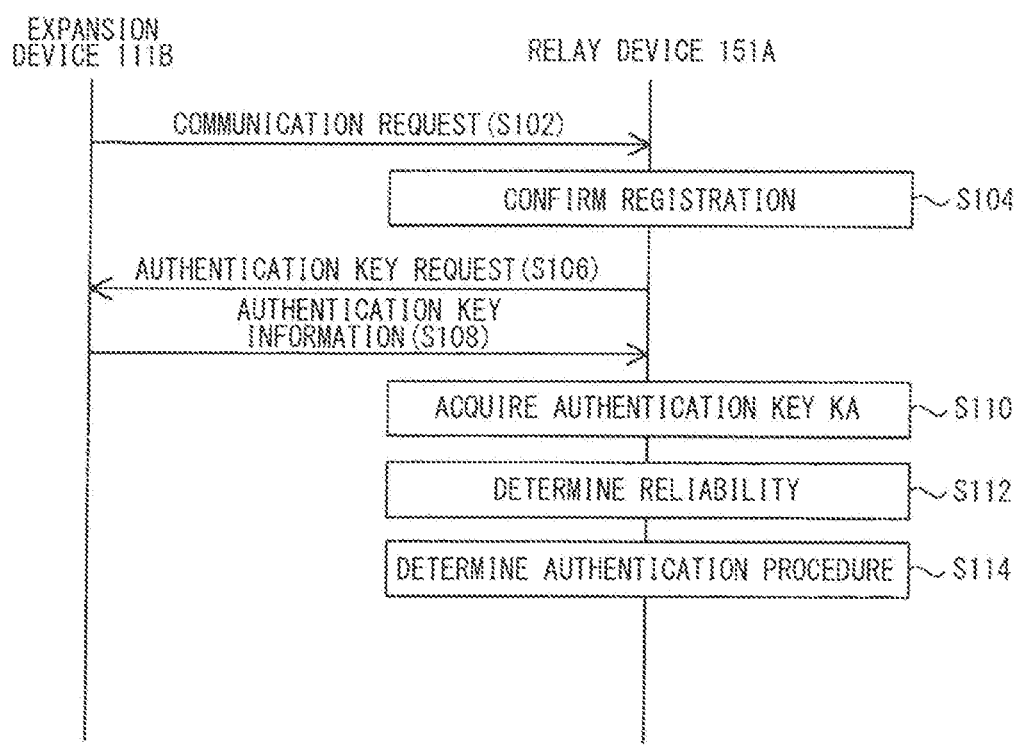
FIG. 5 is a chart showing an example of a sequence in the case where an expansion device has been connected to an on-vehicle network in the on-vehicle communication system according to the embodiment of the present disclosure.

FIG. 5 is a chart showing an example of a sequence in the case where the expansion device has been connected to the on-vehicle network in the on-vehicle communication system according to the embodiment of the present disclosure.

With reference to FIG. 3 to FIG. 5, a situation where the expansion device 111B has been connected to the expansion port is assumed.

First, for example, the expansion device 111B transmits an Ethernet frame including the MAC address of the expansion device 111B and the MAC address of the communication partner device 111C as a transmission-source MAC address and a transmission-destination MAC address, respectively, as a communication request to the relay device 151A (step S102).

Next, upon receiving the Ethernet frame from the expansion device 111B via the expansion port, the relay processing unit 51 in the relay device 151A acquires the transmission-source MAC address and the transmission-destination MAC address included in the received Ethernet frame, and confirms whether or not a communication path based on the acquired transmission-source MAC address and transmission-destination MAC address is registered in the registration information (step S104).

Here, the relay processing unit 51 confirms that the communication path is not registered in the registration information.

Next, since the communication path is not registered in the registration information, the relay processing unit 51 transmits, as an authentication key request, an Ethernet frame including a request for an authentication key used for authentication of the expansion device 111B, to the expansion device 111B (step S106).

Figure 6:
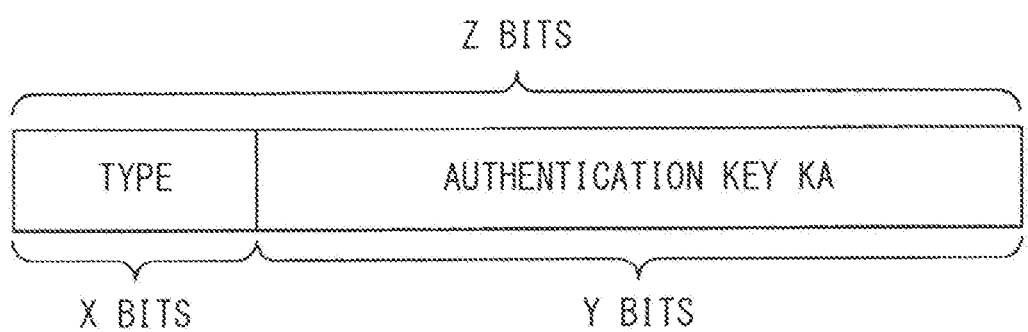
FIG. 6 shows an example of data of an authentication key to be transmitted by the expansion device in the on-vehicle communication system according to the embodiment of the present disclosure.

FIG. 6 shows an example of data of an authentication key to be transmitted by the expansion device in the on-vehicle communication system according to the embodiment of the present disclosure.

With reference to FIG. 6, the data of the authentication key (hereinafter, also referred to as authentication key data) is used in an authentication process with the relay device 151A.

The authentication key data includes a type that is an example of predetermined identification information regarding the expansion device 111B, and an authentication key KA that is used for authentication with the relay device 151A. The size of the authentication key data is Z bits that is the sum of X bits as the size of the type and Y bits as the size of the authentication key KA.

Here, the type is, for example, information with which a place where work for mounting the expansion device 111B is performed is identifiable.

Specifically, for example, when the on-vehicle ECU 111B is an on-vehicle device that is mounted at the manufacturing factory for the vehicle 1, the type indicates manufacturer option.

For example, when the on-vehicle ECU 111B is an on-vehicle device that is mounted at the dealer for the vehicle 1, the type indicates dealer option.

For example, when the on-vehicle ECU 111B is an on-vehicle device that is mounted at the retailer for replacement parts for the vehicle 1 or the like, the type indicates user custom.

Reliability of the manufacturer option, reliability of the dealer option, and reliability of the user custom are high, medium, and low, respectively. Here, the reliability represents the degree of trust of the mounting side for the expansion device 111B. More specifically, the reliability represents the degree of trust of the mounting person and the mounting procedure for the expansion device 111B. Specifically, when the reliability is higher, the expansion device 111B is mounted to the vehicle 1 by a more reliable mounting person according to a more reliable mounting procedure.

Referring back to FIG. 3 to FIG. 5, next, upon receiving the authentication key request from the relay device 151A, in accordance with the received authentication key request, the expansion device 111B encrypts the authentication key data shown in FIG. 6 and transmits an Ethernet frame including the encrypted authentication key data, as authentication key information to the relay device 151A (step S108).

Next, upon receiving the Ethernet frame from the expansion device 111B, the relay processing unit 51 in the relay device 151A acquires the authentication key data from the received Ethernet frame, and acquires the type and the authentication key KA by decrypting the acquired authentication key data (step S110).

Next, the authentication control device 101 determines the reliability of the expansion device 111B (step S112).

In more detail, the relay processing unit 51 outputs type information indicating the acquired type, to the authentication control device 101.

The acquisition unit 21 in the authentication control device 101 acquires predetermined identification information regarding an on-vehicle device that is to be newly added to the on-vehicle network 12.

Specifically, upon receiving the type information from the relay processing unit 51, the acquisition unit 21 outputs the received type information to the determination unit 22.

On the basis of the identification information acquired by the acquisition unit 21, the determination unit 22 determines which of a plurality of types of authentication procedures is to be applied as an authentication process for the expansion device 111B.

In detail, for example, the determination unit 22 determines the reliability of the on-vehicle device on the basis of the identification information acquired by the acquisition unit 21.

In more detail, upon receiving the type information from the acquisition unit 21, the determination unit 22 determines the reliability of the expansion device 111B on the basis of the received type information.

Specifically, when the type information indicates the manufacturer option, the determination unit 22 determines that the reliability of the expansion device 111B is high.

When the type information indicates the dealer option, the determination unit 22 determines that the reliability of the expansion device 111B is intermediate.

When the type information indicates the user custom, the determination unit 22 determines that the reliability of the expansion device 111B is low.

Next, the authentication control device 101 determines an authentication procedure (step S114). In detail, for example, the determination unit 22 determines the authentication procedure corresponding to the determined reliability, from among the plurality of types of authentication procedures.

For example, the plurality of types of authentication procedures include a plurality of authentication procedures that are different from each other in number of authentication devices performing an authentication process for the expansion device 111B and in authentication devices performing an authentication process for the expansion device 111B.

Moreover, for example, the plurality of types of authentication procedures include a plurality of authentication procedures that are different from each other in security level. Here, examples of authentication devices include the relay device 151A which relays data in the on-vehicle network 12.

In this example, the determination unit 22 determines the authentication procedure corresponding to the determined reliability, from among authentication procedures PH, PM, and PL.

Here, the authentication procedure PH is an authentication procedure including an authentication process PA for the expansion device 111B by the relay device 151A.

The authentication procedure PM is an authentication procedure including the authentication process PA and an authentication process PB for the expansion device 111B by the communication partner device 111C.

The authentication procedure PL is an authentication procedure including the authentication process PA, the authentication process PB, and an authentication process PC for the expansion device 111B by the relay device 151B.

The authentication key used in each authentication process is different, for example, for each authentication device. Specifically, authentication keys KA, KB, and KC different from each other are used in the authentication processes PA, PB, and PC, respectively.

The lengths of the authentication keys KA, KB, and KC become longer in this order. That is, the security levels of the authentication processes PA, PB, and PC become higher in this order.

Moreover, authentication methods MA, MB, and MC different from each other are used in the authentication processes PA, PB, and PC, respectively. The security levels of the authentication methods MA, MB, and MC become higher in this order.

For example, when the determined reliability of the on-vehicle device is lower, the determination unit 22 determines an authentication procedure having a larger number of authentication devices performing an authentication process for the on-vehicle device.

Specifically, when the determination unit 22 determines that the reliability of the expansion device 111B is high, the determination unit 22 determines the authentication procedure PH. When the determination unit 22 determines that the reliability of the expansion device 111B is intermediate, the determination unit 22 determines the authentication procedure PM.

When the determination unit 22 determines that the reliability of the expansion device 111B is low, the determination unit 22 determines the authentication procedure PL. The determination unit 22 outputs determination information indicating the determination result, to the relay processing unit 51.

Figure 7:
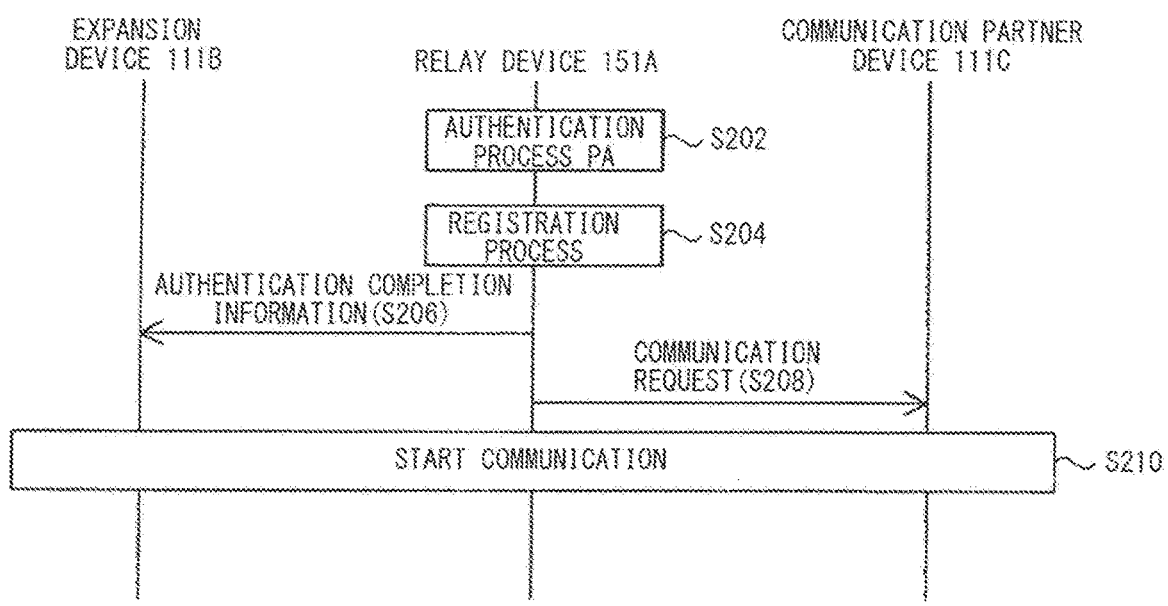
FIG. 7 is a chart showing an example of a sequence in the case where an authentication process for the expansion device is performed in the on-vehicle communication system according to the embodiment of the present disclosure.

FIG. 7 is a chart showing an example of a sequence in the case where the authentication process for the expansion device is performed in the on-vehicle communication system according to the embodiment of the present disclosure.

With reference to FIG. 7, a situation where the determination unit 22 in the authentication control device 101 has determined the authentication procedure PH is assumed.

First, upon receiving determination information indicating the authentication procedure PH from the authentication control device 101, the relay processing unit 51 in the relay device 151A starts the authentication procedure PH in accordance with the received determination information.

In detail, the relay processing unit 51 performs the authentication process PA (step S202). In more detail, the relay processing unit 51 authenticates the authentication key KA included in the authentication key information received from the expansion device 111B, in accordance with the predetermined authentication method MA. Here, the relay processing unit 51 successfully authenticates the authentication key KA.

Next, the relay processing unit 51 registers the communication path based on the MAC address of the expansion device 111B and the MAC address of the communication partner device 111C, which are included in the communication request, in the registration information (step S204).

Accordingly, relay of Ethernet frames transmitted between the expansion device 111B and the communication partner device 111C is permitted.

Next, the relay processing unit 51 transmits authentication completion information indicating that the expansion device 111B has been successfully authenticated, to the expansion device 111B (step S206).

Next, the relay processing unit 51 relays and transmits the communication request to the communication partner device 111C (step S208).

Next, by the relay processing unit 51 relaying Ethernet frames transmitted between the expansion device 111B and the communication partner device 111C, communication between the expansion device 111B and the communication partner device 111C is started (step S210).

When the relay processing unit 51 fails the authentication of the authentication key KA in step S202 described above, the relay processing unit 51 does not register the communication path based on the MAC address of the expansion device 111B and the MAC address of the communication partner device 111C, which are included in the communication request, in the registration information.

With this configuration, Ethernet frames transmitted between the communication partner device 111C and the expansion device 111B that is highly likely to be an unauthorized on-vehicle device are not relayed at the relay processing unit 51, and thus a DoS attack, eavesdropping, etc., by the expansion device 111B can be prevented.

Figure 8:
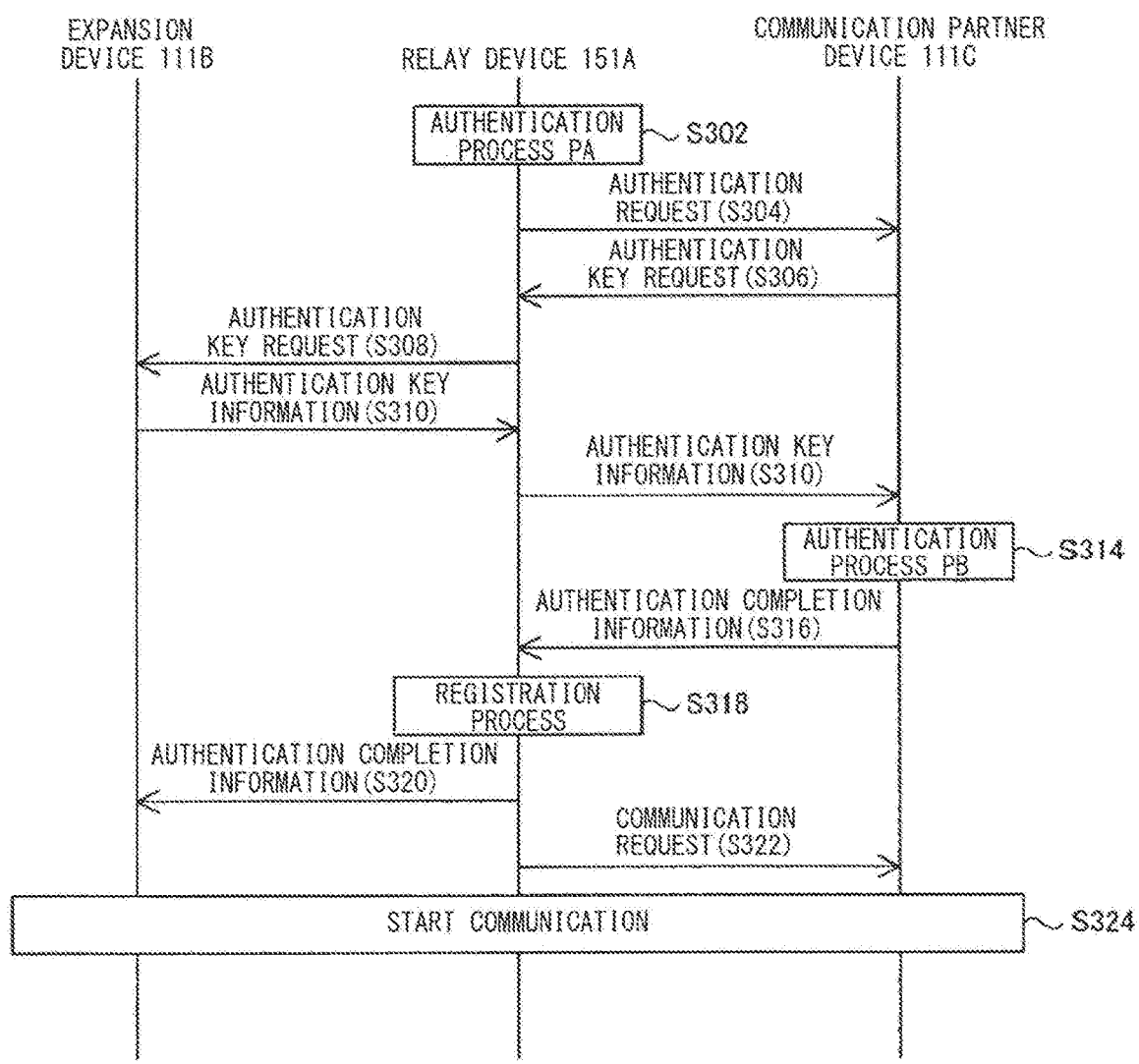
FIG. 8 is a chart showing an example of the sequence in the case where the authentication process for the expansion device is performed in the on-vehicle communication system according to the embodiment of the present disclosure.

FIG. 8 is a chart showing an example of the sequence in the case where the authentication process for the expansion device is performed in the on-vehicle communication system according to the embodiment of the present disclosure.

With reference to FIG. 8, a situation where the determination unit 22 in the authentication control device 101 has determined the authentication procedure PM is assumed.

First, upon receiving determination information indicating the authentication procedure PM from the authentication control device 101, the relay processing unit 51 in the relay device 151A starts the authentication procedure PM in accordance with the received determination information.

In detail, the relay processing unit 51 performs the authentication processing PA (step S302). In more detail, the relay processing unit 51 authenticates the authentication key KA included in the communication request received from the expansion device 111B, in accordance with the predetermined authentication method MA (step S302). Here, the relay processing unit 51 successfully authenticates the authentication key KA.

Next, for example, when the authentication process PA for the expansion device 111B by the relay device 151A has been successfully performed, the relay processing unit 51 instructs the communication partner device 111C, which is to be a communication partner for the expansion device 111B, to start the authentication process PB.

Specifically, the relay processing unit 51 transmits, as an authentication request, an Ethernet frame including a request for authenticating the expansion device 111B, via the communication port 52C to the communication partner device 111C (step S304).

Next, upon receiving the authentication request from the relay device 151A, the communication partner device 111C transmits an authentication key request, the destination of which is the expansion device 111B, to the relay device 151A in accordance with the received authentication request (step S306).

Next, upon receiving the authentication key request from the communication partner device 111C, the relay processing unit 51 in the relay device 151A relays and transmits the received authentication key request to the expansion device 111B (step S308).

Next, upon receiving the authentication key request from the relay device 151A, the expansion device 111B transmits, as authentication key information, an Ethernet frame including the encrypted authentication key KB, to the relay device 151A in accordance with the received authentication key request (step S310). The destination of the authentication key information is the communication partner device 111C.

Next, upon receiving the authentication key information from the expansion device 111B, the relay processing unit 51 in the relay device 151A relays and transmits the received authentication key information to the communication partner device 111C (step S312).

Next, the communication partner device 111C performs the authentication process PB (step S314). In more detail, upon receiving the authentication key information from the relay device 151A, the communication partner device 111C decrypts and authenticates the authentication key KB included in the received authentication key information, in accordance with the predetermined authentication method MB (step S314). Here, the communication partner device 111C successfully authenticates the authentication key KB.

Next, the communication partner device 111C transmits authentication completion information indicating that the expansion device 111B has been successfully authenticated, to the relay device 151A (step S316).

Next, upon receiving the authentication completion information from the communication partner device 111C, the relay processing unit 51 in the relay device 151A recognizes that the expansion device 111B has been successfully authenticated by the communication partner device 111C, on the basis of the received authentication completion information, and performs the following processes.

Specifically, the relay processing unit 51 registers the communication path based on the MAC address of the expansion device 111B and the MAC address of the communication partner device 111C, which are included in the communication request, in the registration information (step S318).

Accordingly, relay of Ethernet frames transmitted between the expansion device 111B and the communication partner device 111C is permitted.

Next, the relay processing unit 51 transmits authentication completion information indicating that the expansion device 111B has been successfully authenticated by the communication partner device 111C and the relay device 151A including the relay processing unit 51, to the expansion device 111B (step S320).

Next, the relay processing unit 51 relays and transmits the communication request to the communication partner device 111C (step S322).

Next, by the relay processing unit 51 relaying Ethernet frames transmitted between the expansion device 111B and the communication partner device 111C, communication between the expansion device 111B and the communication partner device 111C is started (step S324).

When the relay processing unit 51 fails at least either one of the authentication of the authentication key KA in step S302 described above and the authentication of the authentication key KB in step S314 described, the relay processing unit 51 does not register the communication path based on the MAC address of the expansion device 111B and the MAC address of the communication partner device 111C, which are included in the communication request, in the registration information.

The order of step S302 described above and steps S304 to S316 described above is not limited to the above order, and may be reversed.

Figure 9:
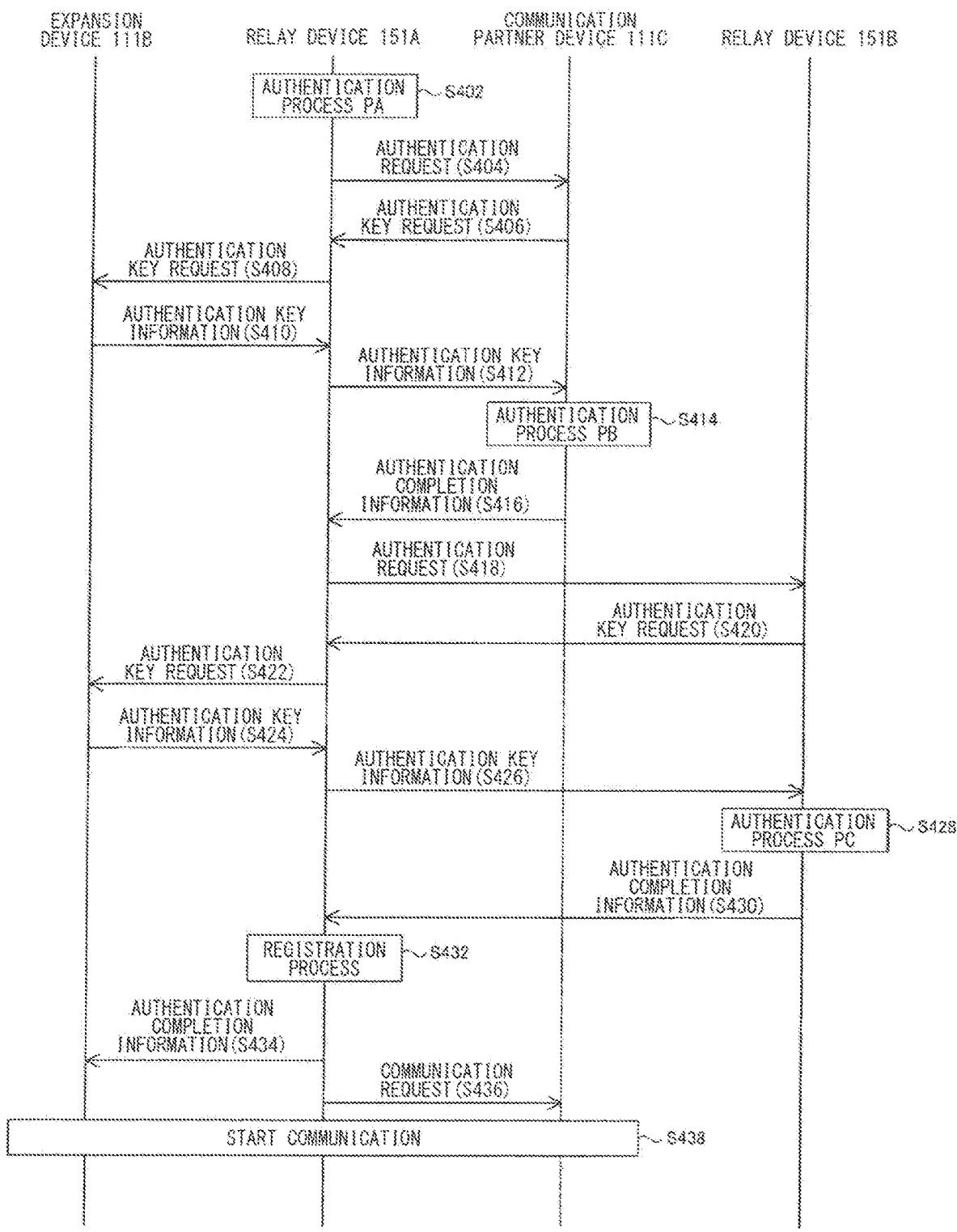
FIG. 9 is a chart showing an example of the sequence in the case where the authentication process for the expansion device is performed in the on-vehicle communication system according to the embodiment of the present disclosure.

FIG. 9 is a chart showing an example of the sequence in the case where the authentication process for the expansion device is performed in the on-vehicle communication system according to the embodiment of the present disclosure.

With reference to FIG. 9, a situation where the determination unit 22 in the authentication control device 101 has determined the authentication procedure PL is assumed.

Operation in steps S402 to S416 is the same as the operation in steps S302 to S316 shown in FIG. 8.

Next, upon receiving the authentication completion information from the communication partner device 111C, the relay processing unit 51 in the relay device 151A recognizes that the expansion device 111B has been successfully authenticated by the communication partner device 111C, on the basis of the received authentication completion information, and performs the following processes.

Specifically, for example, when the authentication process PA for the expansion device 111B by the relay processing unit 51 has been successfully performed, the relay processing unit 51 instructs another relay device, here, the relay device 151B, to start the authentication process PC.

Specifically, the relay processing unit 51 transmits, as an authentication request, an Ethernet frame including a request for authenticating the expansion device 111B, via the communication port 52A to the relay device 151B (step S418).

Next, upon receiving the authentication request from the relay device 151A, the relay device 151B transmits an authentication key request, the destination of which is the expansion device 111B, to the relay device 151A in accordance with the received authentication request (step S420).

Next, upon receiving the authentication key request from the relay device 151B, the relay processing unit 51 in the relay device 151A relays and transmits the received authentication key request to the expansion device 111B (step S422).

Next, upon receiving the authentication key request from the relay device 151A, the expansion device 111B transmits, as authentication key information, an Ethernet frame including the encrypted authentication key KC, to the relay device 151A in accordance with the received authentication key request (step S424). The destination of the authentication key information is the relay device 151B.

Next, upon receiving the authentication key information from the expansion device 111B, the relay processing unit 51 in the relay device 151A relays and transmits the received authentication key information to the relay device 151B (step S426).

Next, the relay device 151B performs the authentication process PC (step S428). In more detail, upon receiving the authentication key information from the relay device 151A, the relay device 151B decrypts and authenticates the authentication key KC included in the received authentication key information, in accordance with the predetermined authentication method MC. Here, the relay device 151B successfully authenticates the authentication key KC.

Next, the relay device 151B transmits authentication completion information indicating that the expansion device 111B has been successfully authenticated, to the relay device 151A (step S430).

Next, upon receiving the authentication completion information from the relay device 151B, the relay processing unit 51 in the relay device 151A recognizes that the expansion device 111B has been successfully authenticated by the relay device 151B, on the basis of the received authentication completion information, and performs the following processes.

Specifically, the relay processing unit 51 registers the communication path based on the MAC address of the expansion device 111B and the MAC address of the communication partner device 111C, which are included in the communication request, in the registration information (step S432).

Accordingly, relay of Ethernet frames transmitted between the expansion device 111B and the communication partner device 111C is permitted.

Next, the relay processing unit 51 transmits authentication completion information indicating that the expansion device 111B has been successfully authenticated by the relay device 151A including the relay processing unit 51, the communication partner device 111C, and the relay device 151B, to the expansion device 111B (step S434).

Next, the relay processing unit 51 relays and transmits the communication request to the communication partner device 111C (step S436).

Next, by the relay processing unit 51 relaying Ethernet frames transmitted between the expansion device 111B and the communication partner device 111C, communication between the expansion device 111B and the communication partner device 111C is started (step S438).

When the relay processing unit 51 fails at least one of the authentication of the authentication key KA in step S402 described above, the authentication of the authentication key KB in step S414 described above, and the authentication of the authentication key KC in step S428 described above, the relay processing unit 51 does not register the communication path based on the MAC address of the expansion device 111B and the MAC address of the communication partner device 111C, which are included in the communication request, in the registration information.

The order of step S402 described above, steps S404 to S416 described above, and steps S418 to S430 described above is not limited to the above order, and a part or all of the order may be changed.

[Modification 1 of Authentication Control Device 101]

FIG. 10 shows an example of an authentication history table retained in the determination unit in the authentication control device according to the embodiment of the present disclosure.

With reference to FIG. 10, the authentication history table includes a correspondence relationship between an ID of an on-vehicle device added, reliability determined for the on-vehicle device, and an authentication result for the on-vehicle device.

In this example, the ID of the on-vehicle device is the MAC address of the on-vehicle device. The ID of the on-vehicle device may be, for example, the serial number of the on-vehicle device.

Figure 11:
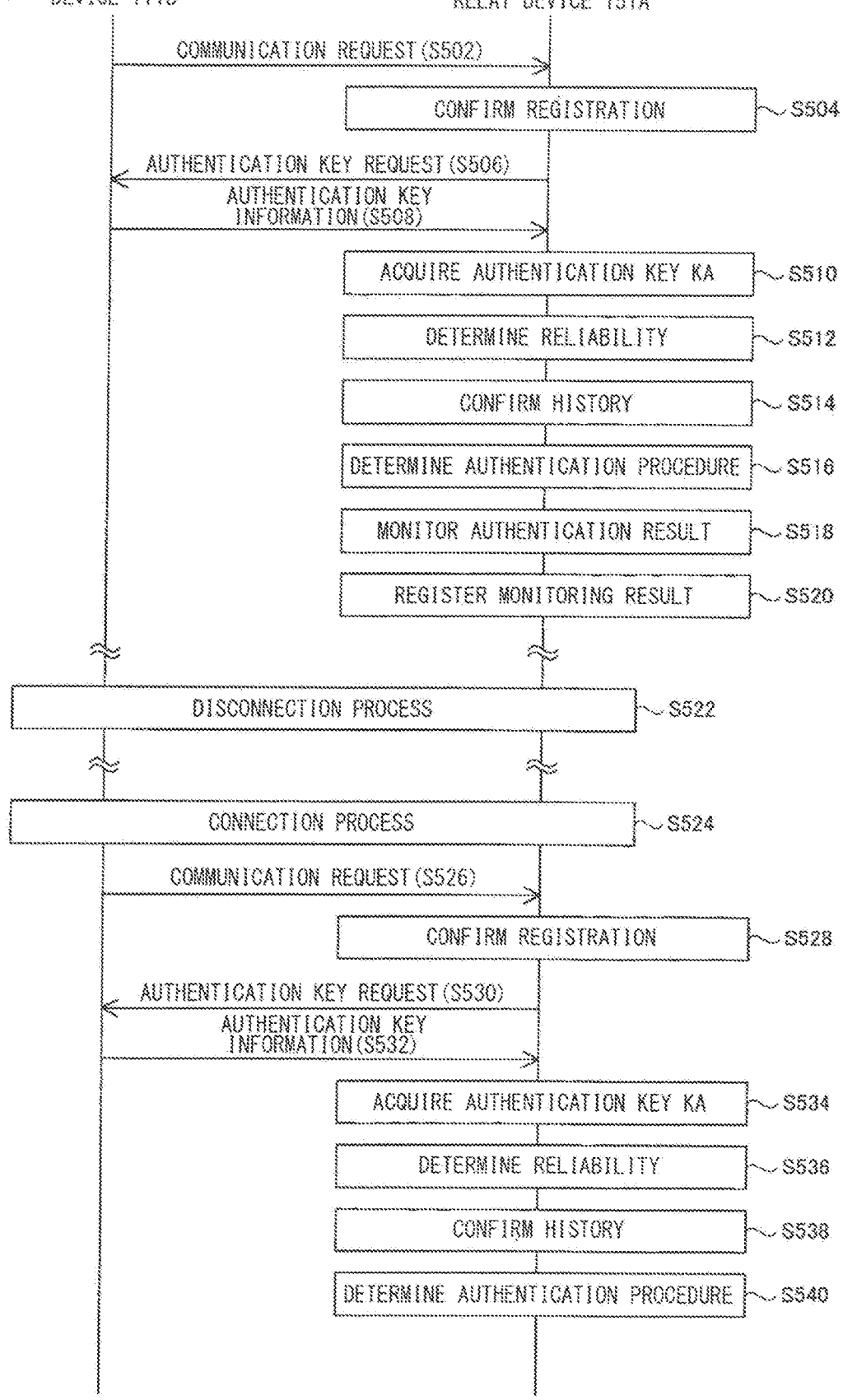
FIG. 11 is a chart showing an example of the sequence in the case where the expansion device has been connected to the on-vehicle network in the on-vehicle communication system according to the embodiment of the present disclosure.

FIG. 11 is a chart showing an example of the sequence in the case where the expansion device has been connected to the on-vehicle network in the on-vehicle communication system according to the embodiment of the present disclosure.

With reference to FIG. 3, FIG. 4, and FIG. 11, a situation where the expansion device 111B has been connected to the expansion port in the relay device 151A is assumed.

Operation in steps S502 to S510 is the same as the operation in steps S102 to S110 shown in FIG. 5.

Next, the authentication control device 101 determines the reliability of the expansion device 111B (step S512).

In more detail, the relay processing unit 51 outputs type information indicating the acquired type, and the transmission-source MAC address included in the communication request, that is, the MAC address of the expansion device 111B, to the authentication control device 101.

Upon receiving the type information and the transmission-source MAC address from the relay processing unit 51, the acquisition unit 21 in the authentication control device 101 outputs the received type information and transmission-source MAC address to the determination unit 22.

Upon receiving the type information and the transmission-source MAC address from the acquisition unit 21, the determination unit 22 determines the reliability of the expansion device 111B on the basis of the received type information. Here, the determination unit 22 determines the reliability of the expansion device 111B as being intermediate.

Next, the determination unit 22 determines whether or not the MAC address of the expansion device 111B is registered in the authentication history table (see FIG. 10) (step S514).

Here, the determination unit 22 confirms that the MAC address of the expansion device 111B is not registered in the authentication history table.

Next, the determination unit 22 determines an authentication procedure (step S516). In detail, for example, the determination unit 22 determines an authentication procedure to be newly applied, on the basis of the identification information acquired by the acquisition unit 21 and the authentication procedure applied for the on-vehicle device in the past.

Here, since the MAC address of the expansion device 111B is not registered in the authentication history table, the determination unit 22 determines the authentication procedure PM corresponding to the determined reliability, from among the authentication procedures PH PM, and PL, and outputs determination information indicating the determination result, to the relay processing unit 51.

Next, the determination unit 22 monitors the authentication procedure PM (FIG. 8) performed by the relay processing unit 51 (step S518).

Here, the authentication process PA (step S302) and the authentication process PB (step S314) shown in FIG. 8 are successfully performed, and the expansion device 111B starts communication with the communication partner device 111C via the relay device 151A (step S324).

Next, the determination unit 22 registers the monitoring result of the authentication procedure PM in the authentication history table (step S520).

FIG. 12 shows an example of the authentication history table retained in the determination unit in the authentication control device according to the embodiment of the present disclosure.

With reference to FIG. 12, the determination unit 22 confirms that the authentication processes PA and PB have been successfully performed, and registers the "MAC address of the expansion device 111B", "intermediate", and "success" as "MAC address", "reliability", and "authentication result" in the authentication history table, respectively.

Referring back to FIG. 3, FIG. 4, and FIG. 11, next, the expansion device 111B and the relay device 151A are disconnected (step S522).

At this time, the communication path based on the MAC address of the expansion device 111B and the MAC address of the communication partner device 111C is deleted from the registration information.

Next, the expansion device 111B is connected to the expansion port in the relay device 151A again (step S524).

Operation in steps S526 to S536 is the same as the operation in steps S502 to S512 described above.

Next, the determination unit 22 confirms whether or not the MAC address of the expansion device 111B is registered in the authentication history table (see FIG. 12) (step S538).

Here, the determination unit 22 confirms that the MAC address of the expansion device 111B is registered in the authentication history table.

Next, the determination unit 22 determines an authentication procedure (step S540). Here, since the MAC address of the expansion device 111B for which the reliability has been determined as being intermediate (step S536) is registered in the authentication history table, the determination unit 22 increases the reliability from intermediate to high, for example.

Then, the determination unit 22 determines the authentication procedure PH corresponding to the increased reliability, from among the authentication procedures PH, PM, and PL, and outputs determination information indicating the determination result, to the relay processing unit 51.

Whereas the determination unit 22 registers "success" of the authentication of the expansion device 111B in the authentication history table in step S520 described above, the determination unit 22 registers "failure" in the authentication history table when the determination unit 22 fails the authentication of the expansion device 111B.

In this case, in step S540 described above, since "failure" is registered as "authentication result" of the expansion device 111B in the authentication history table, the determination unit 22 may keep the reliability intermediate or may decrease the reliability to low, instead of increasing the reliability from intermediate to high.

[Modification 2 of Authentication Control Device 101]

The determination unit 22 in the authentication control device 101 is configured to determine an authentication procedure on the basis of the type which is an example of the identification information in FIG. 5. However, the present disclosure is not limited thereto. The identification information may be, for example, information with which an on-vehicle device is uniquely identifiable. Specifically, the determination unit 22 determines an authentication procedure on the basis of the MAC address of the on-vehicle device.

Figure 13:
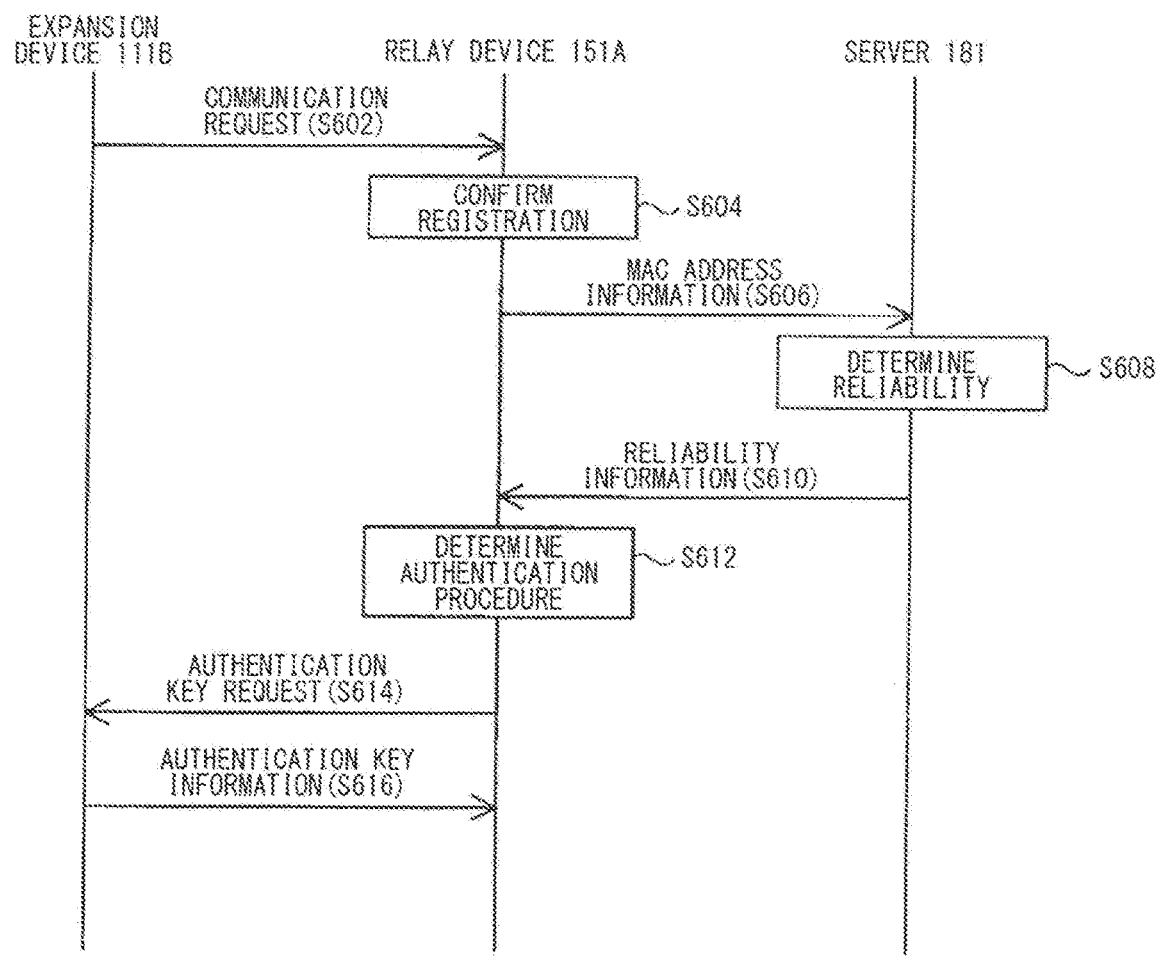
FIG. 13 is a chart showing an example of the sequence in the case where the expansion device has been connected to the on-vehicle network in the on-vehicle communication system according to the embodiment of the present disclosure.

FIG. 13 is a chart showing an example of the sequence in the case where the expansion device has been connected to the on-vehicle network in the on-vehicle communication system according to the embodiment of the present disclosure.

With reference to FIG. 3, FIG. 4, and FIG. 13, a situation where the expansion device 111B has been connected to the expansion port is assumed.

First, for example, the expansion device 111B transmits, as a communication request, an Ethernet frame including the MAC address of the expansion device 111B and the MAC address of the communication partner device 111C as a transmission-source MAC address and a transmission-destination MAC address, respectively, to the relay device 151A (step S620).

Next, upon receiving the Ethernet frame from the expansion device 111B via the expansion port, the relay processing unit 51 in the relay device 151A acquires the transmission-source MAC address and the transmission-destination MAC address included in the received Ethernet frame, and confirms whether or not the communication path based on the acquired transmission-source MAC address and transmission-destination MAC address is registered in the registration information (step S604).

Here, the relay processing unit 51 confirms that the communication path is not registered in the registration information, and outputs MAC address information indicating the acquired transmission-source MAC address, that is, the MAC address of the expansion device 111B, to the authentication control device 101.

Next, upon receiving the MAC address information from the relay processing unit 51 via the acquisition unit 21, the determination unit 22 in the authentication control device 101 transmits the MAC address information to the server 181 via the relay processing unit 51 in order to inquire about the reliability corresponding to the MAC address indicated by the received MAC address information (step S606).

Next, upon receiving the MAC address information from the relay device 151A, the server 181 determines the reliability of the expansion device 111B on the basis of the received MAC address information (step S608).

FIG. 14 shows an example of a reliability table retained in the server in the communication system according to the embodiment of the present disclosure.

With reference to FIG. 14, the reliability table includes a correspondence relationship between the MAC address of an on-vehicle device and the reliability of the on-vehicle device. The correspondence relationship is, for example, registered by the manufacturer of the vehicle 1.

Referring back to FIG. 3, FIG. 4, and FIG. 13, next, the server 181 acquires the reliability corresponding to the MAC address of the expansion device 111B indicated by the received MAC address information, which in this case is intermediate, from the reliability table, and transmits reliability information indicating the acquired reliability, to the relay device 151A (step S610).

Next, upon receiving the reliability information from the server 181, the relay processing unit 51 in the relay device 151A outputs the received reliability information to the authentication control device 101.

Upon receiving the reliability information from the relay processing unit 51 via the acquisition unit 21, the determination unit 22 in the authentication control device 101 determines the authentication procedure PM corresponding to the reliability indicated by the received reliability information, from among the authentication procedures PH, PM, and PL, and outputs determination information indicating the determination result, to the relay processing unit 51 (step S612).

Next, upon receiving the determination information from the authentication control device 101, the relay processing unit 51 starts the authentication procedure PM in accordance with the received determination information.

In detail, the relay processing unit 51 transmits an authentication key request to the expansion device 111B (step S614).

Next, upon receiving the authentication key request from the relay device 151A, the expansion device 111B transmits, as authentication key information, an Ethernet frame including the encrypted authentication key KA, to the relay device 151A in accordance with the received authentication key request (step S616).

Thereafter, for example, the flow of operation shown in FIG. 8 is performed in the expansion device 111B, the relay device 151A, and the communication partner device 111C.

The order of steps S606 to S612 described above and steps S614 to S616 described above is not limited to the above order, and may be reversed.

The identification information is the MAC address. However, the present disclosure is not limited thereto. The identification information may be the serial number of an on-vehicle device. In this case, for example, the server 181 retains a reliability table including a correspondence relationship between the serial number of an on-vehicle device and the reliability of the on-vehicle device.

For example, the relay device 151A acquires the serial number of the expansion device 111B from the expansion device 111B, and transmits serial number information indicating the acquired serial number, to the server 181. Upon receiving the serial number information from the relay device 151A, the server 181 determines the reliability of the on-vehicle device on the basis of the received serial number information and the reliability table.

[Modification 3 of Authentication Control Device 101]

The determination unit 22 in the authentication control device 101 is configured to determine an authentication procedure on the basis of the type which is an example of the identification information in FIG. 5. However, the present disclosure is not limited thereto. The identification information may indicate, for example, the product number of an on-vehicle device. Specifically, the determination unit 22 determines an authentication procedure on the basis of the product number of the on-vehicle device.

Figure 15:
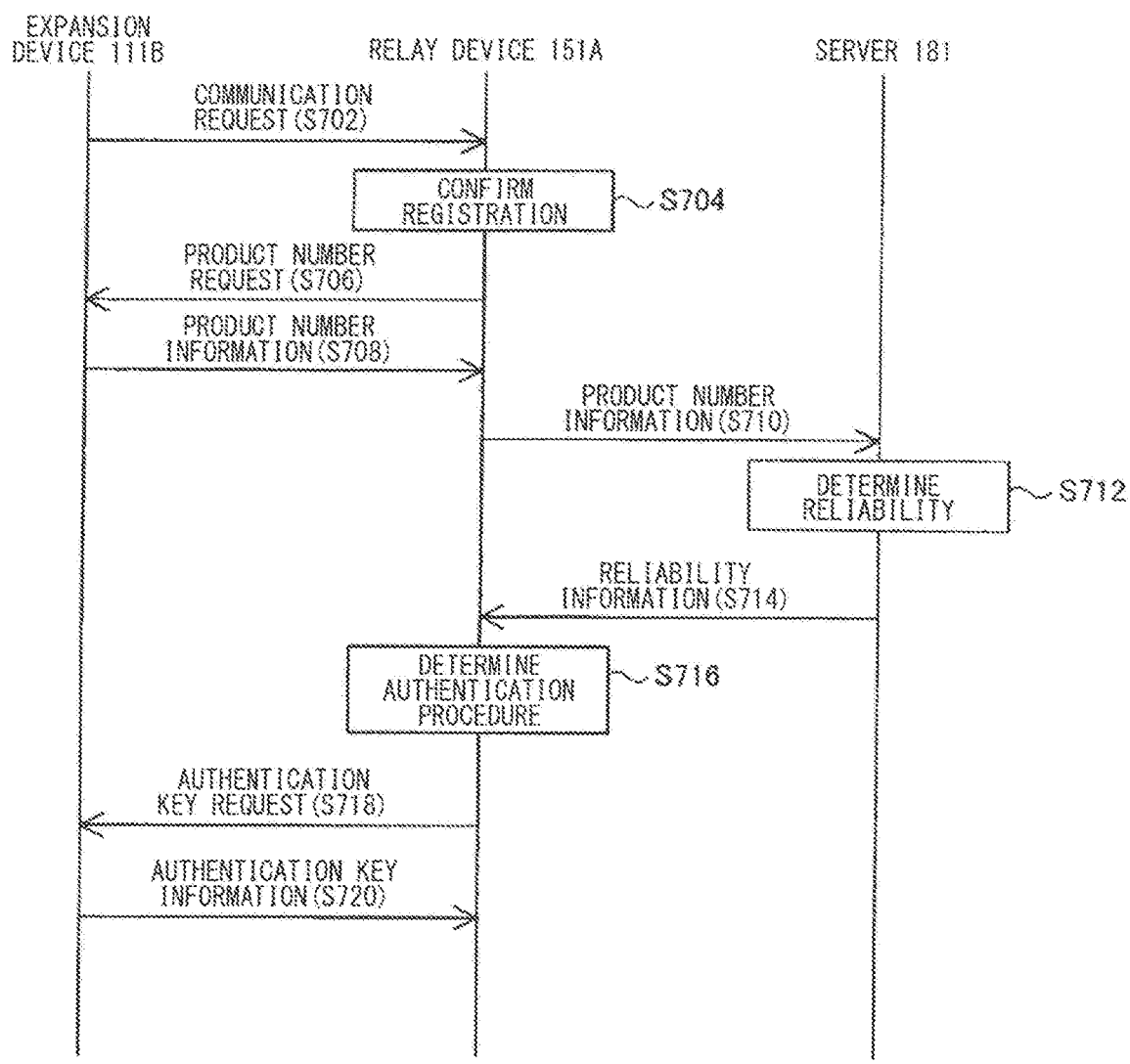
FIG. 15 is a chart showing an example of the sequence in the case where the expansion device has been connected to the on-vehicle network in the on-vehicle communication system according to the embodiment of the present disclosure.

FIG. 15 is a chart showing an example of the sequence in the case where the expansion device has been connected to the on-vehicle network in the on-vehicle communication system according to the embodiment of the present disclosure.

With reference to FIG. 3, FIG. 4, and FIG. 15, a situation where the expansion device 111B has been connected to the expansion port is assumed.

First, for example, the expansion device 111B transmits, as a communication request, an Ethernet frame including the MAC address of the expansion device 111B and the MAC address of the communication partner device 111C as a transmission-source MAC address and a transmission-destination MAC address, respectively, to the relay device 151A (step S702).

Next, upon receiving the Ethernet frame from the expansion device 111B via the expansion port, the relay processing unit 51 in the relay device 151A acquires the transmission-source MAC address and the transmission-destination MAC address included in the received Ethernet frame, and confirms whether or not the communication path based on the acquired transmission-source MAC address and transmission-destination MAC address is registered in the registration information (step S704).

Here, the relay processing unit 51 confirms that the communication path is not registered in the registration information.

Next, since the communication path is not registered in the registration information, the relay processing unit 51 transmits, as a product number request, an Ethernet frame including a request for the product number of the expansion device 111B, to the expansion device 111B (step S706).

Next, upon receiving the product number request from the relay device 151A, the expansion device 111B transmits an Ethernet frame including product number information indicating the product number of the expansion device 111B, to the relay device 151A in accordance with the received product number request (step S708).

Next, upon receiving the Ethernet frame from the expansion device 111B, the relay processing unit 51 in the relay device 151A acquires the product number information from the received Ethernet frame, and outputs the acquired product number information to the authentication control device 101.

Upon receiving the product number information from the relay processing unit 51 via the acquisition unit 21, the determination unit 22 in the authentication control device

101 transmits the product number information to the server 181 via the relay processing unit 51 (step S710) in order to inquire about the reliability corresponding to the product number indicated by the received product number information.

Next, upon receiving the product number information from the relay device 151A, the server 181 determines the reliability of the expansion device 111B on the basis of the received product number information (step S712).

FIG. 16 shows an example of the reliability table retained in the server in the communication system according to the embodiment of the present disclosure.

With reference to FIG. 16, the reliability table includes a correspondence relationship between the product number of an on-vehicle device and the reliability of the on-vehicle device. The correspondence relationship is, for example, registered by the manufacturer of the vehicle 1.

Referring back to FIG. 3, FIG. 4, and FIG. 15, next, the server 181 acquires the reliability corresponding to the product number of the expansion device 111B indicated by the received product number information, which in this case is intermediate, from the reliability table, and transmits reliability information indicating the acquired reliability, to the relay device 151A (step S714).

Operation in steps S716 to S720 is the same as the operation in steps S612 to S616 shown in FIG. 13.

The order of steps S706 to S716 described above and steps S718 to S720 described above is not limited to the above order, and may be reversed.

The identification information indicates the product number of an on-vehicle device. However, the present disclosure is not limited thereto. The identification information may indicate the model number of an on-vehicle device, or may indicate the product number and the model number of an on-vehicle device. In this case, for example, the server 181 retains a reliability table including at least a correspondence relationship between the model number of an on-vehicle device and the reliability of the on-vehicle device.

The relay device 151A acquires the model number of the expansion device 111B from the expansion device 111B (step S708), and transmits model number information indicating the acquired model number, to the server 181 (step S710). Upon receiving the model number information from the relay device 151A, the server 181 determines the reliability of the on-vehicle device on the basis of the received model number information and the reliability table (step S712).

The authentication control device according to the embodiment of the present invention is configured such that the authentication control device is provided in the relay device 151. However, the present disclosure is not limited thereto. The authentication control device 101 may be configured such that the authentication control device 101 is provided in a device outside the relay device 151, such as the on-vehicle ECU 111 and the server 181.

In the authentication control device according to the embodiment of the present disclosure, the acquisition unit 21 is configured to acquire one piece of identification information, and the determination unit 22 is configured to perform the determination process of determining which of the plurality of types of authentication procedures is to be applied as an authentication process, on the basis of the one piece of identification information acquired by the acquisition unit 21. However, the present disclosure is not limited thereto. The acquisition unit 21 may be configured to acquire a plurality of pieces of identification information, and the determination unit 22 may be configured to perform the determination process on the basis of the plurality of pieces of identification information acquired by the acquisition unit 21.

In the authentication control device according to the embodiment of the present disclosure, the determination unit 22 is configured to determine the reliability of an on-vehicle device on the basis of identification information and determine the authentication procedure corresponding to the determined reliability. However, the present disclosure is not limited thereto. For example, the determination unit 22 may be configured to retain a correspondence relationship between identification information and an authentication procedure and determine the authentication procedure corresponding to the identification information on the basis of the correspondence relationship.

In the authentication control device according to the embodiment of the present disclosure, the plurality of types of authentication procedures, specifically, the authentication procedures PH, PM, and PL, include a plurality of authentication procedures different from each other in number of authentication devices performing the authentication processes PA, PB, and PC for an on-vehicle device. However, the present disclosure is not limited thereto. The plurality of types of authentication procedures may include a plurality of authentication procedures that are the same in number of authentication devices performing an authentication process for an on-vehicle device.

In the authentication control device according to the embodiment of the present disclosure, the plurality of types of authentication procedures, specifically, the authentication procedures PH, PM, and PL, include a plurality of authentication procedures different from each other in authentication devices performing the authentication processes PA, PB, and PC for an on-vehicle device. However, the present disclosure is not limited thereto. The plurality of types of authentication procedures may include a plurality of authentication procedures that are the same in authentication devices performing an authentication process for an on-vehicle device.

In the authentication control device according to the embodiment of the present disclosure, the authentication keys KA, KB, and KC used in the authentication processes PA, PB, and PC, respectively, are different for each authentication device. However, the present disclosure is not limited thereto. Some or all of the authentication keys KA, KB, and KC used in the authentication processes PA, PB, and PC, respectively, may be the same.

In the authentication control device according to the embodiment of the present disclosure, the relay device 151A is configured to authenticate the expansion device 111B in the authentication procedure PH shown in FIG. 7. However, the present disclosure is not limited thereto. The communication partner device 111C may be configured to authenticate the expansion device 111B in the authentication procedure PH.

In the authentication control device according to the embodiment of the present disclosure, the relay device 151A is configured to instruct the communication partner device 111C, which is to be a communication partner for the expansion device 111B, to start the authentication process PB when the authentication process PA for the expansion device 111B by the relay device 151A has been successfully performed, in the authentication procedure PM shown in FIG. 8. However, the present disclosure is not limited thereto. The relay device 151A may be configured to instruct the relay device 151B to start the authentication process PC when the authentication process PA for the expansion device 111B by the relay device 151A has been successfully performed, in the authentication procedure PM.

In the authentication control device according to the embodiment of the present disclosure, the lengths of the authentication keys KA, KB, and KC used in the authentication processes PA, PB, and PC, respectively, become longer in this order. However, the present disclosure is not limited thereto. Some or all of the lengths of the authentication keys KA, KB, and KC may be the same.

In the authentication control device according to the embodiment of the present disclosure, the security levels of the authentication methods MA, MB, and MC used in the authentication processes PA, PB, and PC, respectively, become higher in this order. However, the present disclosure is not limited thereto. Some or all of the security levels of the authentication methods MA, MB, and MC may be the same.

In the authentication control device according to the embodiment of the present disclosure, the determination unit 22 is configured to determine an authentication procedure having a larger number of authentication devices performing an authentication process for an on-vehicle device when the determined reliability is lower. However, the present disclosure is not limited thereto. The determination unit 22 may be configured to determine an authentication procedure having a smaller number of authentication devices performing an authentication process for an on-vehicle device when the determined reliability is lower.

Meanwhile, in the on-vehicle network system disclosed in PATENT LITERATURE 1, an on-vehicle control device that performs communication not complying with a communication protocol, for example, a DOS attack, eavesdropping, etc., is detected as an unauthorized on-vehicle control device.

Thus, the on-vehicle control device can perform a DoS attack and eavesdropping until the same is detected as an unauthorized on-vehicle control device.

In order to prevent such a DoS attack, eavesdropping, etc., from being performed, a configuration that does not permit an unauthorized on-vehicle control device to participate in the on-vehicle network system is preferable. However, such a configuration is not disclosed in PATENT LITERATURE 1.

In contrast, in the authentication control device according to the embodiment of the present disclosure, the acquisition unit 21 acquires predetermined identification information regarding an on-vehicle device to be newly added to the on-vehicle network 12. Then, on the basis of the identification information acquired by the acquisition unit 21, the determination unit 22 determines which of the plurality of types of authentication procedures is to be applied as an authentication process for the on-vehicle device.

With the configuration to determine which of the plurality of types of authentication procedures is to be applied on the basis of the identification information as described above, for example, authentication corresponding to an on-vehicle device to be newly added can be performed. Thus, whether or not the on-vehicle device is valid can be more correctly determined. Accordingly, an unauthorized on-vehicle device can be detected before unauthorized communication such as a DoS attack and eavesdropping is performed, and thus occurrence of unauthorized communication in the on-vehicle network 12 can be prevented. Therefore, satisfactory communication can be provided in the on-vehicle network.

In the authentication control device according to the embodiment of the present disclosure, the determination unit 22 determines the reliability of an on-vehicle device on the basis of the identification information acquired by the acquisition unit 21, and determines the authentication procedure corresponding to the determined reliability.

With this configuration, for example, a strict authentication procedure can be applied for an on-vehicle device for which the reliability has been determined as being low. Thus, the accuracy of detection of an unauthorized on-vehicle device can be improved. In addition, for example, a simple authentication procedure can be applied for an on-vehicle device for which the reliability has been determined as being high. Thus, the load of the authentication process can be reduced.

In the authentication control device according to the embodiment of the present disclosure, the identification information is information with which a place where work for mounting an on-vehicle device is performed is identifiable.

For example, the degree of involvement of a vehicle manufacturer with respect to an on-vehicle device is different depending on a place where work for mounting the on-vehicle device is performed, such as a manufacturing factory, a dealer, or another place. With the above configuration, appropriate evaluation for the reliability, the validity, etc., of an on-vehicle device can be performed on the basis of the degree of involvement corresponding to a place where work for mounting the on-vehicle device has been performed.

In the authentication control device according to the embodiment of the present disclosure, the identification information indicates at least either one of the product number and the model number of an on-vehicle device.

With this configuration, for example, the manufacturer, the production time, and the specifications of an on-vehicle device can be recognized on the basis of at least either one of the product number and the model number of the on-vehicle device. Thus, appropriate evaluation for the reliability, the validity, etc., of the on-vehicle device can be performed.

In the authentication control device according to the embodiment of the present disclosure, the identification information is information with which an on-vehicle device is uniquely identifiable.

With this configuration, for example, the manufacturer, the production time, the specifications, etc., corresponding to the identification information can be acquired from the server 181 retaining a correspondence relationship between: information with which an on-vehicle device is uniquely identifiable; and the manufacturer, the production time, the specifications, etc., of the on-vehicle device. Thus, appropriate evaluation for the reliability, the validity, etc., of the on-vehicle device can be performed.

In the authentication control device according to the embodiment of the present disclosure, the determination unit 22 determines an authentication procedure to be newly applied, on the basis of an authentication procedure applied for an on-vehicle device in the past.

With this configuration, for example, a simple authentication procedure can be newly applied for an on-vehicle device for which an authentication result by an authentication procedure applied in the past is satisfactory. In addition, a strict authentication procedure can be newly applied for an on-vehicle device for which the above authentication result is bad. That is, the authentication procedure corresponding to the above authentication result can be applied. Therefore, the authentication process can be efficiently performed.

In the authentication control device according to the embodiment of the present disclosure, the authentication control device 101 is included in the relay device 151A which relays data in the on-vehicle network 12.

With the configuration in which the authentication control device 101 is included in the relay device 151A capable of more assuredly performing communication with an on-vehicle device as described above, an authentication procedure can be more assuredly determined.

In the authentication control device according to the embodiment of the present disclosure, the identification information is included in the authentication key data used in the authentication process with the relay device 151A.

The configuration in which the identification information is included in the authentication key data can make it difficult to falsify the identification information in order to cause a simpler authentication procedure to be determined. Thus, an unauthorized on-vehicle device can be prevented from successfully impersonating a valid on-vehicle device.

In the authentication control device according to the embodiment of the present disclosure, the plurality of types of authentication procedures include a plurality of authentication procedures different from each other in number of authentication devices performing an authentication process for an on-vehicle device.

With this configuration, the number of authentication devices can be varied in accordance with the reliability, the validity, etc., of an on-vehicle device. Thus, the strictness of each authentication procedure can be adjusted as appropriate.

In the authentication control device according to the embodiment of the present disclosure, the plurality of types of authentication procedures include a plurality of authentication procedures different from each other in authentication devices performing an authentication process for an on-vehicle device.

With this configuration, different authentication devices can be used depending on the reliability, the validity, etc., of an on-vehicle device. Thus, the strictness of each authentication procedure can be adjusted as appropriate.

In the authentication control device according to the embodiment of the present disclosure, the authentication key used in the authentication process is different for each authentication device.

With the configuration in which the authentication key is made different for each authentication device as described above, the authentication process can be complicated. Thus, it can be made difficult to break through the authentication process by fraud. That is, the security in the on-vehicle network 12 can be improved.

In the authentication control device according to the embodiment of the present disclosure, the relay device 151A which relays data in the on-vehicle network 12 is included in the authentication device.

With the configuration in which the relay device 151A which is the linchpin of data transmission in the on-vehicle network 12 is included in the authentication device as described above, for example, when an authenticated on-vehicle device is actually unauthorized, data transmission by unauthorized communication of the on-vehicle device can be more assuredly stopped.

In the authentication control device according to the embodiment of the present disclosure, when the authentication process for an on-vehicle device by the relay device 151A has been successfully performed, the relay device 151A instructs another on-vehicle device that is to be a communication partner for the on-vehicle device, to start the authentication process.

With the configuration to perform the authentication process between on-vehicle devices, which are to perform communication with each other in the on-vehicle network 12, when the authentication process by the relay device 151A has been successfully performed as described above, the validity of a newly added on-vehicle device can be more correctly determined.

In the authentication control device according to the embodiment of the present disclosure, when the authentication process for an on-vehicle device by the relay device 151A has been successfully performed, the relay device 151A instructs the relay device 151B to start the authentication process.

With the configuration to cause the relay device 151B to perform the authentication process for a newly added on-vehicle device when the authentication process by the relay device 151A has been successfully performed as described above, the validity of the on-vehicle device can be more correctly determined.

In the authentication control device according to the embodiment of the present disclosure, the plurality of types of authentication procedures include a plurality of authentication procedures different from each other in security level.

With this configuration, the security level can be varied in accordance with the reliability, the validity, etc., of an on-vehicle device. Thus, the strictness of each authentication procedure can be adjusted as appropriate.

In the authentication control device according to the embodiment of the present disclosure, the determination unit 22 determines the reliability of an on-vehicle device on the basis of the identification information acquired by the acquisition unit 21, and determines an authentication procedure having a larger number of authentication devices performing an authentication process for an on-vehicle device when the determined reliability is lower.

With the configuration to cause more authentication devices to authenticate an on-vehicle device having low reliability, that is, an on-vehicle device that is highly likely to be unauthorized, as described above, whether or not a newly added on-vehicle device is valid can be more correctly determined.

The above embodiments are illustrative in all aspects and should not be recognized as being restrictive. The scope of the present invention is defined by the scope of the claims rather than the above description, and is intended to include meaning equivalent to the scope of the claims and all modifications within the scope.

The above description includes the features in the additional note below.

[Additional Note 1]

An authentication control device including:

an acquisition unit configured to acquire predetermined identification information regarding an on-vehicle device to be newly added to an on-vehicle network; and a determination unit configured to determine which of a plurality of types of authentication procedures is to be applied as an authentication process for the on-vehicle device, on the basis of the identification information acquired by the acquisition unit, wherein the on-vehicle device is a telematics communication unit (TCU), an autonomous driving electronic control unit (ECU), a sensor, a navigation device, a human machine interface, or a camera, the authentication control device is included in a server or a relay device configured to relay data in the on-vehicle network, and the identification information is a type included in an authentication key used in the authentication process with the relay device, or a media access control (MAC) address, a serial number, a product number, or a model number of the on-vehicle device.

REFERENCE SIGNS LIST 1 vehicle
11 external network
12 on-vehicle network
21 acquisition unit
22 determination unit
51 relay processing unit
52 communication port
101 authentication control device
111 on-vehicle ECU
111A TCU
111B expansion device
111C communication partner device
151 relay device
161 wireless base station device
181 server
201 communication system
301 on-vehicle communication system

The invention claimed is:

1. An authentication control method for an authentication control device, the authentication control method comprising the steps of:
  acquiring predetermined identification information regarding an on-vehicle device to be newly added to an on-vehicle network;
  determining which of a plurality of types of authentication procedures is to be applied as an authentication process for the on-vehicle device, on the basis of the acquired identification information; and
  determining a reliability level representing a degree of trust of a mounting person and a mounting procedure for the on-vehicle device from among a plurality of reliability levels, on the basis of the identification information that is acquired, and determining the authentication procedure corresponding to the determined reliability level.

2. An authentication control device comprising:
  an acquisition unit configured to acquire predetermined identification information regarding an on-vehicle device to be newly added to an on-vehicle network; and
  a determination unit configured to determine which of a plurality of types of authentication procedures is to be applied as an authentication process for the on-vehicle device, on the basis of the identification information acquired by the acquisition unit, wherein
  the determination unit determines a reliability level representing a degree of trust of a mounting person and a mounting procedure for the on-vehicle device from among a plurality of reliability levels, on the basis of the identification information acquired by the acquisition unit, and determines the authentication procedure corresponding to the determined reliability level.

3. The authentication control device according to claim 2, wherein the identification information is information with which a place where work for mounting the on-vehicle device is performed is identifiable.

4. The authentication control device according to claim 2, wherein the identification information is at least either one of a product number and a model number of the on-vehicle device.

5. The authentication control device according to claim 2, wherein the identification information is information with which the on-vehicle device is uniquely identifiable.

6. The authentication control device according to claim 2, wherein the determination unit determines the authentication procedure to be newly applied, further on the basis of the authentication procedure applied for the on-vehicle device in the past.

7. The authentication control device according to claim 2, wherein the authentication control device is included in a relay device configured to relay data in the on-vehicle network.

8. The authentication control device according to claim 7, wherein the identification information is included in an authentication key used in the authentication process with the relay device.

9. The authentication control device according to claim 2, wherein the plurality of types of authentication procedures include a plurality of authentication procedures different from each other in number of authentication devices performing the authentication process for the on-vehicle device.

10. The authentication control device according to claim 2, wherein the plurality of types of authentication procedures include a plurality of authentication procedures different from each other in authentication devices performing the authentication process for the on-vehicle device.

11. The authentication control device according to claim 9, wherein an authentication key used in the authentication process is different for each authentication device.

12. The authentication control device according to claim 9, wherein a relay device configured to relay data in the on-vehicle network is included in the authentication device.

13. The authentication control device according to claim 12, wherein, when the authentication process for the on-vehicle device by the relay device has been successfully performed, the relay device instructs another on-vehicle device that is to be a communication partner for the on-vehicle device, to start the authentication process.

14. The authentication control device according to claim 12, wherein, when the authentication process for the on-vehicle device by the relay device has been successfully performed, the relay device instructs another relay device to start the authentication process.

15. The authentication control device according to claim 2, wherein each authentication procedure of the plurality of types of authentication procedures has a different security level.

16. The authentication control device according to claim 2, wherein the determination unit determines the reliability of the on-vehicle device on the basis of the identification information acquired by the acquisition unit, and determines the authentication procedure having a larger number of authentication devices performing the authentication process for the on-vehicle device when the determined reliability is lower.

17. A non-transitory computer readable storage medium storing an authentication control program used in an authentication control device, the authentication control program causing a computer to:
  acquire predetermined identification information regarding an on-vehicle device to be newly added to an on-vehicle network;
  determine which of a plurality of types of authentication procedures is to be applied as an authentication process for the on-vehicle device, on the basis of the identification information that is acquired; and determine a reliability level representing a degree of trust of a mounting person and a mounting procedure for the on-vehicle device from among a plurality of reliability levels, on the basis of the identification information that is acquired, and determine the authentication procedure corresponding to the determined reliability level.

* * * * *